United States Patent
Wu et al.

(10) Patent No.: US 8,885,455 B2
(45) Date of Patent: Nov. 11, 2014

(54) METHOD AND APPARATUS FOR SENDING AND PROCESSING DATA MODULATED USING MODULATION FACTORS

(75) Inventors: Tao Wu, Shenzhen (CN); Yinwei Zhao, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 641 days.

(21) Appl. No.: 12/789,163

(22) Filed: May 27, 2010

(65) Prior Publication Data
US 2010/0232348 A1    Sep. 16, 2010

Related U.S. Application Data

(63) Continuation of application No. PCT/CN2008/073143, filed on Nov. 21, 2008.

(30) Foreign Application Priority Data

Nov. 27, 2007  (CN) .......................... 2007 1 0171667
Jan. 14, 2008   (CN) .......................... 2008 1 0002138

(51) Int. Cl.
| | | |
|---|---|---|
| H04J 9/00 | (2006.01) | |
| H04L 5/04 | (2006.01) | |
| H04W 4/00 | (2009.01) | |
| H04B 7/02 | (2006.01) | |
| H04B 1/66 | (2006.01) | |
| H04L 27/34 | (2006.01) | |
| H04B 7/155 | (2006.01) | |
| H04L 1/00 | (2006.01) | |
| H04L 1/06 | (2006.01) | |

(52) U.S. Cl.
CPC ......... *H04L 27/34* (2013.01); *H04L 2001/0097* (2013.01); *H04L 1/0668* (2013.01); *H04L 1/0625* (2013.01); *H04B 7/15592* (2013.01)
USPC ............ 370/204; 370/334; 455/101; 455/102

(58) Field of Classification Search
CPC ........... H04L 1/06; H04L 1/08; H04L 1/0003; H04L 1/1887; H04L 5/143; H04L 27/34; H04L 27/0008
USPC ........... 370/204, 315, 329, 334; 455/101, 102
See application file for complete search history.

(56) References Cited

U.S. PATENT DOCUMENTS 7,154,961 B2    12/2006  Wengerter et al.
7,649,953 B2 *  1/2010   Bauch ........................... 375/267
(Continued)

FOREIGN PATENT DOCUMENTS

CN    1620776 A    5/2005
CN    1839606 A    9/2006
(Continued)

OTHER PUBLICATIONS

Miyano, T., et al., "Cooperative Relaying Scheme with Space Time Code for Multihop Communications among Single Antennna Terminals", IEEE Communications Society, Globecom 2004, pp. 3763-3767.

(Continued)

*Primary Examiner* — Hoang-Chuong Vu
(74) *Attorney, Agent, or Firm* — Slater & Matsil, L.L.P.

(57) ABSTRACT

A method for sending data includes obtaining data packets to be sent and modulating, by each transmit diversity branch, the data packets by using modulation mode corresponding to the each transmit diversity branch, and sending the modulated data packets. The modulation modes form a preset optimized combination of modulation modes. A different modulation mode corresponds to a different group of modulation factors and/or different group of constellation modulation symbols. The different groups of modulation factors comply with a preset modulation factor mapping relationship. The different groups of constellation modulation symbols comply with a preset constellation modulation symbol mapping relationship.

19 Claims, 8 Drawing Sheets

(56) References Cited

U.S. PATENT DOCUMENTS

| | | | |
|---|---|---|---|
| 2002/0032001 A1* | 3/2002 | Fischer et al. | 455/3.01 |
| 2004/0022174 A1* | 2/2004 | Li et al. | 370/203 |
| 2004/0048619 A1* | 3/2004 | Kim et al. | 455/452.1 |
| 2005/0193307 A1* | 9/2005 | Wengerter et al. | 714/749 |
| 2006/0039499 A1 | 2/2006 | Chae et al. | |
| 2006/0172710 A1* | 8/2006 | Cahana et al. | 455/101 |
| 2007/0047629 A1* | 3/2007 | Fulghum | 375/148 |
| 2007/0086539 A1* | 4/2007 | Hocevar | 375/267 |
| 2007/0258357 A1* | 11/2007 | Akita | 370/208 |
| 2008/0159253 A1* | 7/2008 | Yamazaki et al. | 370/347 |
| 2008/0170640 A1 | 7/2008 | Gao et al. | |
| 2008/0317168 A1* | 12/2008 | Yang et al. | 375/298 |
| 2009/0052576 A1* | 2/2009 | Golitschek Edler Von Elbwart et al. | 375/298 |
| 2009/0097589 A1* | 4/2009 | Chen et al. | 375/295 |
| 2010/0029320 A1* | 2/2010 | Malladi et al. | 455/522 |
| 2010/0157874 A1* | 6/2010 | Lin et al. | 370/315 |
| 2012/0128105 A1* | 5/2012 | Murakami et al. | 375/341 |

FOREIGN PATENT DOCUMENTS

| | | | | |
|---|---|---|---|---|
| WO | 2006048061 A1 | 5/2006 | | |
| WO | WO 2006/076599 A1 | 7/2006 | | |
| WO | WO 2006/138203 A1 | 12/2006 | | |
| WO | WO 2007/089110 A2 | 8/2007 | | |
| WO | WO 2009113763 A1 * | 9/2009 | | H04L 1/00 |

OTHER PUBLICATIONS

Written Opinion of the International Searching Authority, International Application No. PCT/CN2008/073143, Dated: Feb. 19, 2009, 4 pages.

European Search Report, European Application No. 08855166.8-1237222009, Applicant: Huawei Technologies Co., Ltd., Dated: Mar. 3, 2011, 7 pages.

Chinese Office Action and Partial Translation received in Chinese Patent Application No. 200810002138.X, mailed Feb. 24, 2011, 13 pages.

Chinese Office Action and Partial Translation received in Chinese Patent Application No. 200810002138.X, mailed Feb. 13, 2012, 13 pages.

Vucetic, Branka, et al., "Space-Time Coding," and Translation, Space-Time Block Code, Chapter 3, Jun. 27, 2003.

International Search Report, International application No. PCT/CN2008/073143, Date of mailing of the international search report Feb. 19, 2009, 4 pages.

European Patent Office, Communication pursuant to Article 94(3) EPC Application No. 08 855 166.8-1237, Applicant Huawei Technologies Co., Ltd., mailing date Oct. 10, 2012, 4 pages.

Summons to attend oral proceedings pursuant to Rule 115(1) EPC, received in Application No. 08855166.8-1851 mailed Jul. 22, 2013, 6 pages.

* cited by examiner under harsh natural conditions. Thus, the data retransmission technology becomes one of critical technologies meeting the high reliability requirement.

METHOD AND APPARATUS FOR SENDING AND PROCESSING DATA MODULATED USING MODULATION FACTORS

This application is a continuation of co-pending International Application No. PCT/CN2008/073143, filed Nov. 21, 2008, which designated the United States and was not published in English, and which claims priority to Chinese Application No. 200710171667.8 filed Nov. 27, 2007 and Chinese Application No. 200810002138.X filed Jan. 14, 2008, which applications are incorporated herein by reference.

TECHNICAL FIELD

The present invention relates to radio communication technologies, and in particular, to a method and apparatus for sending, forwarding, and processing data.

BACKGROUND

In the 3rd generation (3G) mobile communication system and the 4th generation (4G) mobile communication system, high rate data transmission is available. In addition, higher reliability requirements are imposed on these systems, especially under harsh natural conditions. Thus, the data retransmission technology becomes one of critical technologies meeting the high reliability requirement.

The data retransmission technology is a time diversity technology in essence, and can improve the performance of radio communication systems. Besides the time diversity technology, multiple diversity technologies are available. The principles of these diversity technologies are the same as the principle of the time diversity technology. That is, after a group of data is transmitted on one diversity, the group of data is retransmitted one time or multiple times on another diversity. Common diversity technologies include the time diversity technology, cell diversity technology, polarization diversity technology, frequency diversity technology, space diversity technology, code diversity technology, and relay diversity technology. To fully use the time domain resource, frequency domain resource, or code domain resource of a channel, a hierarchical modulation technology is introduced in radio communication technologies. The hierarchical modulation realizes better coverage with an enhanced technology while guaranteeing the most basic receiving quality, thus providing a better receiving effect. In hierarchical modulation mode, a receiving end with a better signal to noise ratio (SNR) receives data streams of two layers concurrently, while a receiving end with a poor SNR receives only the data of the basic layer.

The following describes the hierarchical modulation technology by taking a multimedia broadcast multicast service (MBMS) as an example. To meet SNR requirements of different receiving ends without occupying additional spectrum resources, a same data stream is divided into multilayer data for modulation, and then the modulated data is transmitted. For better description, the following takes a two-layer data stream as an example. The MBMS server transmits information $b_0 b_1 b_2 b_3$ to the receiving end through a base station (BS). Herein, $b_0 b_1$ indicates the basic layer data in the hierarchical modulation and is mapped to a quaternary phase shift keying (QPSK) symbol x. $b_2 b_3$ indicates the enhanced layer data and is mapped to a QPSK symbol y. x and Y are multiplied by the corresponding modulation factors (assumed to be $\alpha$ and $\beta$, where $$\alpha = \frac{2\sqrt{2}}{\sqrt{10}} \text{ and } \beta = \frac{\sqrt{2}}{\sqrt{10}}\text{)},$$

and are superposed into a 16-state quadrature amplitude modulation (QAM) symbol z ($z = \alpha x + \beta y$), and then the 16-state QAM symbol z is sent. When the BS actively retransmits the MBMS, the BS still modulates the basic layer data and the enhanced layer data into $z = \alpha x + \beta y$ in hierarchical mode.

The receiving end with a higher SNR receives both the basic layer data and the enhanced layer data. The receiving end with a lower SNR receives only the basic layer data. If the receiving end with a lower SNR also receives the enhanced layer data, the receiving end may also enjoy better quality of service (QoS). After receiving the transmitted data, the receiving end demodulates the basic layer data and the enhanced layer data, and then processes the data. Demodulating the received data twice may obtain a bit class logarithm likelihood ratio (LLR) value that is transmitted twice, which includes the basic layer data and the enhanced layer data. The signal of the transmitting end may be restored through combination and decoding of the LLR values, where the combination may adopt maximal ratio combining (MRC) or selective combining (SC) algorithms.

SUMMARY OF THE INVENTION

Embodiments of the present invention provide a method and apparatus for sending, forwarding, and processing data. The technical solution provided in embodiments of the present invention can reduce the frame error rate and the bit error rate, and improve the performance.

The objective of embodiments of the present invention is achieved through the following technical solution.

A method for sending data is applied in a communication system with N (a positive integer greater than 1) transmit diversity branches and includes obtaining data packets to be sent. Each transmit diversity branch modulates the data packets by using a modulation mode corresponding to the each transmit diversity branch, and sends the modulated data packets. The modulation modes form a preset optimized combination of modulation mode. A different modulation mode corresponds to a different group of modulation factors and/or a different group of constellation modulation symbols. The different groups of modulation factors comply with a preset modulation factor mapping relationship. The different groups of constellation modulation symbols comply with a preset constellation modulation symbol mapping relationship.

A method for forwarding data includes receiving data packets modulated by using a first modulation mode. The data packets are modulated using a second modulation mode corresponding to the first modulation mode and sent. The first modulation mode and the second modulation mode form a preset optimized combination. A first group of modulation factors for modulating the data packets by using the first modulation mode is different than a second group of modulation factors for modulating the data packets by using the second modulation mode or a first group of constellation modulation symbols of the first modulation mode is different than a second group of constellation modulation symbols of the second modulation mode. The first group of modulation factors and the second group of modulation factors comply with a preset modulation factor mapping relationship. The first group of constellation modulation symbols and the second group of constellation modulation symbols comply with a preset constellation modulation symbol mapping relationship.

In a method for sending data includes, a first transmit diversity branch and a second transmit diversity branch obtain data packets to be sent. The first transmit diversity branch modulates the data packets by using a first modulation mode and sends the modulated data packets. The second transmit diversity branch modulates the data packets by using a second modulation mode and sends the modulated data packets. The first modulation mode and the second modulation mode form a preset optimized combination. A first group of modulation factors for modulating the data packets by using the first modulation mode is different than a second group of modulation factors for modulating the data packets by using the second modulation mode. The first group of modulation factors and the second group of modulation factors comply with a preset modulation factor mapping relationship.

A method for processing data includes receiving at least two modulated modulation combinations obtained by using modulation modes. The modulation modes form a preset optimized combination of modulation modes. Different modulation modes correspond to different groups of modulation factors and/or different group of constellation modulation symbols. The different groups of modulation factors comply with a preset modulation factor mapping relationship. The different groups of constellation modulation symbols comply with a preset constellation modulation symbol mapping relationship. Signal detection is performed on the at least two modulated modulation combinations by using a preset signal reception technology and modulated data packets are obtained. The modulated data packets are demodulated to obtain data.

An apparatus for sending data includes an information obtaining unit that is adapted to obtain data packets to be sent. A number of transmitting units are adapted to modulate the data packets by using modulation modes corresponding to the transmitting units and send the modulated data packets. The modulation modes form a preset optimized combination of modulation modes. A different modulation mode corresponds to a different group of modulation factors and/or a different group of constellation modulation symbols. The different groups of modulation factors comply with a preset modulation factor mapping relationship. The different groups of constellation modulation symbols comply with a preset constellation modulation symbol mapping relationship.

An apparatus for forwarding data includes a receiving unit that is adapted to receive data packets modulated by using a first modulation mode. A forwarding unit is adapted to modulate the data packets by using a second modulation mode corresponding to the first modulation mode and send the modulated data packets. The first modulation mode and the second modulation mode form a preset optimized combination. A first group of modulation factors for modulating the data packets by using the first modulation mode is different from a second group of modulation factors for modulating the data packets by using the second modulation mode and/or a first group of constellation modulation symbols of the first modulation mode is different from a second group of constellation modulation symbols of the second modulation mode. The first group of modulation factors and the second group of modulation factors comply with a preset modulation factor mapping relationship. The first group of constellation modulation symbols and the second group of constellation modulation symbols comply with a preset constellation modulation symbol mapping relationship.

An apparatus for processing data includes an information receiving unit that is adapted to receive at least two modulated modulation combinations obtained by using modulation modes. The modulation modes form a preset optimized combination of modulation modes. A different modulation mode corresponds to a different group of modulation factors and/or a different group of constellation modulation symbols. The different groups of modulation factors comply with a preset modulation factor mapping relationship; the different groups of constellation modulation symbols comply with a preset constellation modulation symbol mapping relationship. A detecting unit is adapted to perform signal detection on the at least two modulated modulation combinations by using a preset signal reception technology to obtain modulated data packets. A demodulating unit is adapted to demodulate the modulated data packets to obtain data.

In the technical solution provided in embodiments of the present invention, each group of modulation factors corresponding to each modulation mode complies with the preset modulation factor mapping relationship and/or each group of constellation modulation symbols complies with the preset constellation modulation symbol mapping relationship, so that the data corresponding to the data packets may have different symbols. Thus, the symbol errors, the frame error rate, and the bit error rate are reduced, and the system performance is improved.

BRIEF DESCRIPTION OF THE DRAWINGS

To make the technical solution under the present invention or in the prior art clearer, the accompanying drawings for illustrating the embodiments of the present invention or illustrating the prior art are outlined below. Evidently, the accompanying drawings are exemplary only, and those skilled in the art can derive other drawings from such accompanying drawings without creative work.

DETAILED DESCRIPTION OF ILLUSTRATIVE EMBODIMENTS

During the implementation of the present invention, the inventor finds at least the following problems in the prior art. Although the data retransmission solution in the prior art can improve the system performance, it considers only the combination of bit class LLR values; thus, it neither reduces the symbol errors and nor improves the performance greatly.

The technical solution of the present invention is hereinafter described in detail with reference to the accompanying drawings. It is evident that the embodiments are only exemplary embodiments of the present invention and the present invention is not limited to such embodiments. Other embodiments that those skilled in the art obtain based on embodiments of the present invention also fall within the scope of protection of the present invention.

Figure 1:
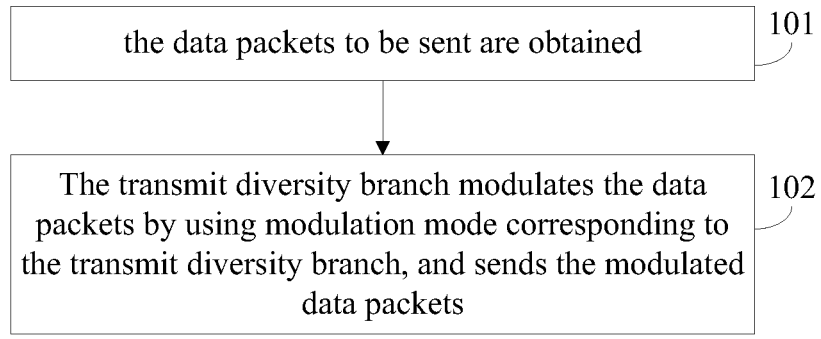
FIG. 1 is a flowchart in a first embodiment of the present invention.

FIG. 1 is a flowchart of a method for sending data in the first embodiment of the present invention. The method for sending data is applied in a communication system with N (a positive integer greater than 1) transmit diversity branches and includes the following steps.

Step 101: The data packets to be sent are obtained;

The data packets in this embodiment may undergo a coding process, for example, Forward Error Correction (FEC) coding. After undergoing the coding process, the data packets may be interleaved.

Step 102: The transmit diversity branch modulates the data packets by using modulation mode corresponding to the transmit diversity branch, and sends the modulated data packets;

The modulation modes form a preset optimized combination of modulation modes; and a different modulation mode corresponds to a different group of modulation factors and/or a different group of constellation modulation symbols. The different groups of modulation factors comply with a preset modulation factor mapping relationship, and the different groups of constellation modulation symbols comply with a preset constellation modulation symbol mapping relationship.

The process of modulating the data packets by using the modulation modes corresponding to the transmit diversity branches and sending the modulated data packets by the transmit diversity branches includes obtaining a group of modulation factors corresponding to the data packets; mapping the data packets to constellation points according to a preset constellation modulation mode, and obtaining constellation modulation symbols corresponding to the data packets; combining the group of modulation factors with the constellation modulation symbols into a modulation combination; and sending the modulation combination. Combining the first group of modulation factors, the constellation modulation symbols, and the coding matrix may improve the flexibility.

The optimized combination in this embodiment is a combination with a better transmission effect selected from all the possible combinations. The optimized combination enables better data transmission, thus reducing the frame error rate and bit error rate, and improving the system performance.

The preset modulation factor mapping relationship may be as follows. Different groups of modulation factors have at least one different modulation factor. Specifically, different modulation factors meet one of the following conditions: identical absolute value, mutual conjugation, and identical modulus.

The preset constellation modulation symbol mapping relationship may be as follows. Different groups of constellation modulation symbols have at least one different constellation modulation symbol. Different constellation modulation symbols meet one of the following conditions: identical absolute value, mutual conjugation, and identical modulus.

In this embodiment, each group of modulation factors corresponding to each modulation factor complies with the preset modulation factor mapping relationship, and/or the constellation modulation symbols comply with the preset constellation modulation symbol mapping relationship. Different groups of modulation factors have at least one different modulation factor, and different constellation modulation symbols have at least one different constellation modulation symbol. In this way, the data corresponding to the data packets may have different symbols, thus implementing the symbol combination, reducing the frame error rate and bit error rate, and improving the system performance.

After sending the modulated data packets, the transmit diversity branches need to send IDs of modulation modes for modulating the data packets, so that the receiving end may detect the received information properly. Certainly, the data packets may be combined for transmission. In this way, the transmit diversity branches do not need to send the IDs of modulation modes for modulating the data packets.

Figure 2:
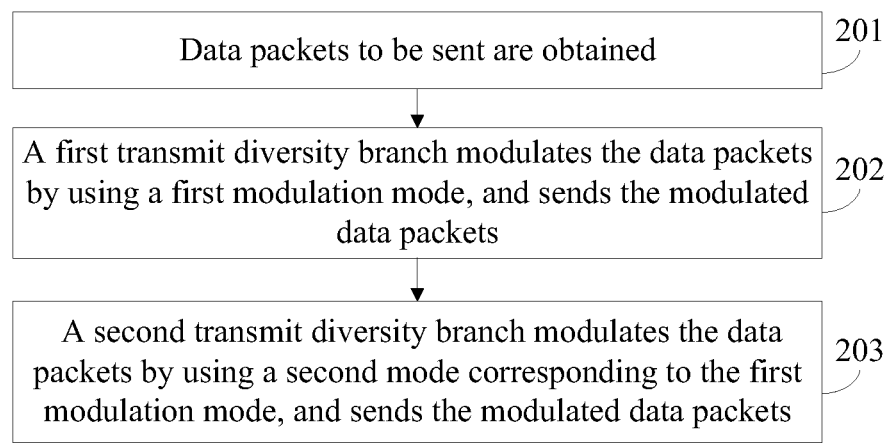
FIG. 2 is a flowchart in a second embodiment of the present invention.

FIG. 2 is a flowchart of a method for sending data in the second embodiment of the present invention. This embodiment is based on two transmit diversity branches. The process includes step 201, step 202, and step 203.

Step 201: Data packets to be sent are obtained;

Step 202: A first transmit diversity branch modulates the data packets by using a first modulation mode, and sends the modulated data packets;

The first modulation mode may be preset, so that the first modulation mode may be found after the data packets are obtained. The process of modulating the data packets by using the first modulation mode and sending the modulated data packets by the first transmit diversity branch includes the following steps.

The first transmit diversity branch obtains a first group of modulation factors corresponding to the data packets, maps the data packets to the constellation points according to the preset constellation modulation mode, obtains constellation modulation symbols corresponding to the data packets, combines the first group of modulation factors and the constellation modulation symbols into a first modulation combination, and then sends the first modulation combination.

In this embodiment, the available modulation modes include QPSK, 8-phase shift keying (8PSK), 8-state amplitude phase shift keying (8APSK), 64QAM, and 128QAM. Alternatively, multiple low order constellation modulation modes may be superposed into a high order modulation mode. For example, two QPSK constellation points are superposed into a 16QAM constellation point. When low order constellation modulation modes need to be superposed into a high order modulation mode, the obtained data may be divided into packets, and the first group of modulation factors is obtained. Each packet corresponds to a modulation factor in the first group of modulation factors. For example, two QPSK constellation points are superposed into a 16QAM constellation point. Suppose a data packet b0b1b2b3 is divided into two groups, namely, b0b1 and b2b3. b0b1 is mapped to the modulation symbol x of the QPSK constellation point; b2b3 is mapped to the modulation symbol y of the QPSK constellation point; the first group of modulation factors is $[\alpha,\beta]$, where a corresponds to b0b1 and $\beta$ corresponds to b2b3. Then, the data packet b0b1b2b3 may be superposed into a 16QAM constellation point modulation symbol $\alpha x+\beta y$ for transmission.

Step 203: A second transmit diversity branch modulates the data packets by using a second mode corresponding to the first modulation mode, and sends the modulated data packets.

The first modulation mode and the second modulation mode form a preset optimized combination. The first modulation mode and the second modulation mode adopt different modulation factors for modulating the data packets. The first group of modulation factors used by the first modulation mode and a second group of modulation factors used by the second modulation mode comply with the preset modulation factor mapping relationship, and/or the first group of constellation modulation symbols used by the first modulation mode and a second group of constellation modulation symbols used by the second modulation mode comply with the preset constellation modulation symbol mapping relationship.

The first transmit diversity branch and the second transmit diversity branch may be time diversities at different time, different transmitting antennas at the same BS, antennas at different BSs, or different receiving ends, which are not limited in this embodiment of the present invention.

The process of sending the data packets by using the second modulation mode by the second transmit diversity branch is the same as the process of sending the data packets by using the first modulation mode by the first transmit diversity branch except for the difference in the modulation factors for modulating the data packets. The first group of modulation factors used by the first modulation mode and the second group of modulation factors used by the second modulation mode comply with the preset modulation factor mapping relationship. The modulation factor mapping relationship may be as follows. The first group of modulation factors and the second group of modulation factors have the identical absolute value (when the number of modulation factors is a real number); or the first group of modulation factors is the conjugation of the second group of modulation factors (when the number of modulation factors is a complex number and the modulation factors are conjugated); or the first group of modulation factors and the second group of modulation factors have the identical modulus (when the number of modulation factors is a complex number and the modulation factors are conjugated). The first modulation mode and the second modulation mode may adopt different constellation modulation symbols for modulating the data packets. The first group of constellation modulation symbols adopted by the first modulation mode and the second group of constellation modulation symbols adopted by the second modulation mode comply with the preset constellation modulation symbol mapping relationship. The constellation modulation symbol mapping relationship is similar to the modulation factor mapping relationship, and is not further described. The preceding modes are preferred modes in embodiments of the present invention.

For example, two QPSK constellation points are superposed into a 16QAM constellation point. Suppose a data packet b0b1b2b3 is divided into two groups: b0b1 and b2b3, where b0b1 is mapped to the modulation symbol x of the QPSK constellation point and is pre-allocated a modulation factor $\alpha$; b2b3 is mapped to the modulation symbol y of the QPSK constellation point and is pre-allocated a modulation factor $\beta$. Then, the first transmit diversity sends the data packet in the form of $\alpha x+\beta y$. When $\alpha$ is a real number, the second diversity branch may combine the data packet into $\alpha x-\beta y$ or $-\alpha x+\beta y$ for transmission. When $\alpha$ and $\beta$ are complex numbers, $\alpha=|\alpha|e^{j\Theta_1}$, $\beta=|\beta|e^{j\Theta_2}$, $A=|\alpha|e^{j\Theta_2}$, and $B=|\beta|e^{j\Theta_1}$, where $|*|$ indicates the modulus of "*". For example, $$\alpha = \frac{2\sqrt{2}}{\sqrt{10}}e^{j\theta_1}, \beta = \frac{\sqrt{2}}{\sqrt{10}}e^{j\theta_2}, A = \frac{2\sqrt{2}}{\sqrt{10}}e^{j\theta_2}, \text{ and } B = \frac{2\sqrt{2}}{\sqrt{10}}e^{j\theta_1}.$$

The second diversity branch may combine the data packet into $A^*x-B^*y$, $-A^*x+B^*y$, $Ax^*-By^*$, and $-Ax^*+By^*$ for transmission. In this case, when $\alpha$ is a real number, the optimized combination of the first modulation mode and the second modulation mode may be preset to $\alpha x+\beta y$ and $\alpha x-\beta y$, or $\alpha x+\beta y$ and $-\alpha x+\beta y$. When $\alpha$ and $\beta$ are complex numbers, the optimized combination of the first modulation mode and the second modulation mode may be preset to $\alpha x+\beta y$ and $A^*x-B^*y$, $\alpha x+\beta y$, and $-A^*x+B^*y$, $\alpha x+\beta y$ and $-Ax^*+By^*$, or $\alpha x+\beta y$ and $Ax^*-By^*$. The sequence of modulation modes in the optimized combination may be changed.

Thus, the process of sending the data packets by using the second modulation mode corresponding to the first modulation mode by the second transmit diversity branch may include the following steps. The second transmit diversity branch obtains a second group of modulation factors corresponding to the data packets, where the second group of modulation factors and the first group of modulation factors comply with the preset modulation factor mapping relationship, combines the second group of modulation factors and the constellation modulation symbols into a second modulation combination, and then sends the second modulation combination.

Or the preceding process may include the following steps. The second transmit diversity branch obtains a second group of modulation factors corresponding to the data packets, combines the second group of modulation factors and the second group of constellation modulation symbols into a second modulation combination, where the second group of constellation modulation symbols and the first group of constellation modulation symbols used by the first modulation mode comply with the preset constellation modulation symbol mapping relationship, and then sends the second modulation combination. The pre-coding matrixes may be combined to obtain the second modulation combination to improve the flexibility.

If multiple first modulation modes are available (for example, when $\alpha$ is a real number, the first modulation mode may be $\alpha x+\beta y$, $\alpha x-\beta y$, or $-\alpha x+\beta y$, each bearing a preset ID), after a first modulation mode is selected, the ID of the selected first modulation mode needs to be sent, so that the receiving end may obtain the first modulation mode for modulation. Similarly, if multiple second modulation modes are available, after a second modulation mode is selected, the ID of the selected first modulation mode needs to be sent.

Certainly, a specific combination mode may be pre-agreed between the transmitting end and the receiving end. Thus, the agreed combination mode may be directly used for transmission during communication, without sending the ID of the modulation mode for modulating the data packet each time.

In this embodiment, the second group of modulation factors and the first group of modulation factors with a certain inherent relationship and/or the second group of constellation modulation symbols and the first group of constellation modulation symbols with a certain inherent relationship are preferred, where the relationship may be one of the following: same, identical absolute value, mutual conjugation, and identical modulus. The present invention may be implemented so long as the receiving end that receives the first modulation combination and the second modulation combination can obtain the first group of modulation factors and the second group of modulation factors for modulation. For example, the receiving end is notified by using a control signaling message.

In the case that a data packet is sent many times, the data may be transmitted on any two neighboring transmit diversity branches by using the method provided in this embodiment. The two neighboring transmit diversity branches are two neighboring transmit diversities that transmit the data. The neighboring transmit diversity branches may be the same transmitting antenna, different transmitting antennas of the same BS, or transmitting antennas of different BSs.

In this embodiment, the first group of modulation factors used by the first modulation mode and the second group of modulation factors used by the second modulation mode comply with the preset modulation factor mapping relationship, and/or the first group of constellation modulation symbols used by the first modulation mode and the second group of constellation modulation symbols used by the second modulation mode comply with the preset constellation modulation symbol mapping relationship. Different groups of modulation factors have at least one different modulation factor, and different groups of constellation modulation symbols have at least one constellation modulation symbol. In this way, the first combination and the second combination may have different symbols, so that the errors such as noises (for example, the error in the second transmission and the error in the first transmission) may not be deflected in the same direction due to the difference in symbols. Thus, the symbol errors of the data packets obtained by the receiving ends are reduced; the frame error rate and the bit error rate are reduced; and the system performance and the communication accuracy are improved.

Figure 3:
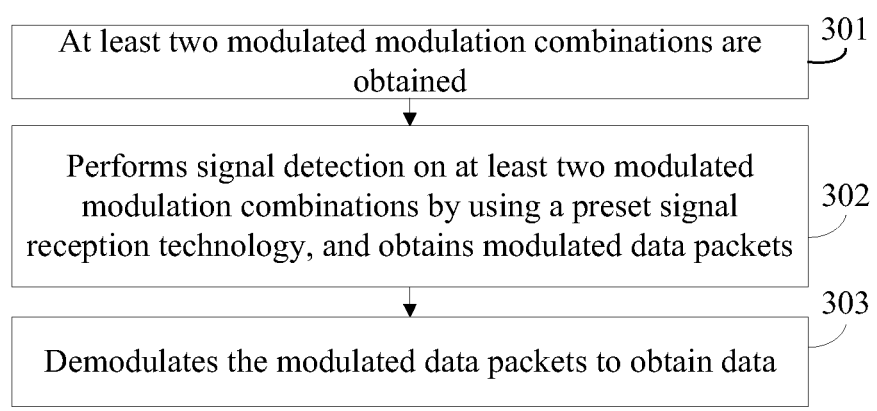
FIG. 3 is a flowchart in a third embodiment of the present invention.

FIG. 3 is a flowchart of a method for processing data in the third embodiment of the present invention. The process includes step 301, step 302, and step 303.

Step 301: At least two modulated modulation combinations are obtained;

The modulation combinations are obtained by using modulation modes. The modulation modes form a preset optimized combination of modulation modes; and a different modulation mode corresponds to a different group of modulation factors and/or a different group of constellation modulation symbols. The different groups of modulation factors comply with a preset modulation factor mapping relationship, and the different groups of constellation modulation symbols comply with a preset constellation modulation symbol mapping relationship.

Step 302: Performs signal detection on at least two modulated modulation combinations by using a preset signal reception technology, and obtains modulated data packets.

The signal reception technology includes zero-forcing (ZF), linear minimum mean-squared error (L-MMSE), maximum likelihood (ML), successive interference cancellation (SIC), and parallel interference cancellation (PIC).

Multiple modulation modes may be available. Thus, before the signal detection is performed on at least two modulated modulation combinations by using the preset signal reception technology, IDs of modulation modes of at least two modulation combinations need to be received. If modulation modes are agreed between the receiving end and the transmitting end, the IDs of the modulation modes do not need to be received.

If IDs of corresponding modulation modes are received, the signal detection needs to be performed on at least two modulated modulation combinations by using the preset signal reception technology according to the IDs of the modulation modes.

With the radio channel characteristics, the received modulated data packets include noises and interference signals.

Step 303: Demodulates the modulated data packets to obtain data.

The demodulation adopts a mode corresponding to the modulation.

Because the data packets detected by using the signal reception technology include errors, the demodulated data packets are not identical with the data packets sent by the transmitting end, but are infinitely near the data packets sent by the transmitting end according to the modulation and demodulation modes.

According to the preceding description, because at least two modulated modulation combinations received are modulated by using different modulation modes, the modulation factors used by different modulation modes comply with the preset modulation factor mapping relationship and/or the constellation modulation symbols comply with the preset constellation modulation symbol mapping relationship. In this embodiment, because the received at least two modulation combinations may have different symbols, the symbol errors may be reduced, the frame error rate and the bit error rate are reduced, and the system performance is improved greatly. In addition, the signal detection technology may be used to reduce the frame error rate and the bit error rate, improve the system performance, and increase the communication accuracy.

The following describes an embodiment of the method for sending data and an embodiment of the method for processing data in specific scenarios. The fourth embodiment of the present invention describes a data transmission process in a multi-receiving-end communication system with at least one transmitting antenna and multiple receiving antennas. The following takes the MBMS system as an example.

In the MBMS system, the hierarchical data is multiplexed to the same time frequency resource by using the hierarchical modulation technology, so as to save the spectrum resource of the system. The specific hierarchical modulation mode is notified to the receiving end through a control signaling message. The receiving end with better channel conditions receives the basic layer data and enhanced layer data, thus obtaining a higher data rate. The receiving end with poor channel quality receives only the basic layer data, thus obtaining a basic data rate. When the constellation modulation needs to be performed for the second transmission of data, the data is transmitted by using a hierarchical modulation mode different from the previous one, and the receiving end is notified of the specific hierarchical modulation method through a control signaling message. Specifically, modulation factors different from the previous ones are used for modulation.

(1) 16QAM Single-Input Single-Output (SISO) Mode

Figure 4:
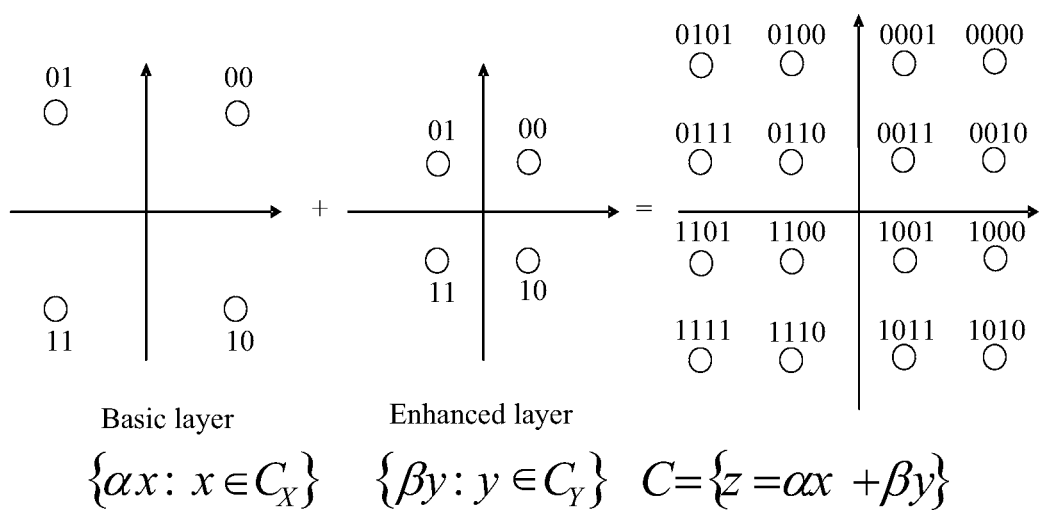
FIG. 4 is a schematic diagram illustrating the superposition of two QPSK constellation points into a 16QAM constellation point in a fourth embodiment of the present invention.

In SISO mode, the MBMS server sends information to the receiving end through a BS. Suppose the data added to the CRC at the MAC layer of the BS is changed to $b_0 b_1 b_2 b_3$ after undergoing the FEC. $b_0 b_1$ indicates the basic layer data and is mapped to the QPSK constellation point modulation symbol x; $b_2b_3$ indicates the enhanced layer data and is mapped to the QPSK constellation point modulation symbol y. Certainly, the data may also be mapped by using other grouping methods. For example, $b_0b_2$ is mapped to the constellation symbol x, and $b_1b_3$ is mapped to the constellation symbol y. X and Y are multiplied by the corresponding modulation factors $\alpha$ and $\beta$, and then superposed into a 16QAM constellation point modulation symbol for transmission. FIG. 4 illustrates the superposition of two QPSK constellation points into a 16QAM constellation point. The details are as follows. The basic layer data is mapped to the data packets $$00\left(\frac{1+j}{\sqrt{2}}\right), 01\left(\frac{-1+j}{\sqrt{2}}\right), 11\left(\frac{-1-j}{\sqrt{2}}\right), \text{ and } 10\left(\frac{1-j}{\sqrt{2}}\right)$$

on the QPSK constellation point, and thus $C_X$ is $$\left[\frac{1+j}{\sqrt{2}}, \frac{-1+j}{\sqrt{2}}, \frac{-1-j}{\sqrt{2}}, \frac{1-j}{\sqrt{2}}\right].$$

Similarly, the enhanced layer data is mapped to the data packets $$00\left(\frac{1+j}{\sqrt{2}}\right), 01\left(\frac{-1+j}{\sqrt{2}}\right), 11\left(\frac{-1-j}{\sqrt{2}}\right), \text{ and } 10\left(\frac{1-j}{\sqrt{2}}\right)$$

on the QPSK constellation point, and thus $C_Y$ is $$\left[\frac{1+j}{\sqrt{2}}, \frac{-1+j}{\sqrt{2}}, \frac{-1-j}{\sqrt{2}}, \frac{1-j}{\sqrt{2}}\right].$$

After the data packets are superposed into a 16QAM constellation point, the data on the 16QAM constellation point is 0011, 0010, 0001, 0000, 0111, 0110, 0101, 0100, 1111, 1110, 1101, 1100, 1011, 1010, 1001, and 1000 respectively. The modulation factor $\alpha$ corresponding to the combined data packets of the basic layer is changed to $\alpha x$, while the modulation factor $\beta$ corresponding to the combined data packets of the enhanced layer is changed to $\beta y$. Thus, z is equal to $\alpha x + \beta y$ after the data packets are superposed into the 16QAM constellation point.

Because there are two modulation factors, the number of modulation orders is equal to 2. Two QPSK constellation point modulation symbols are superposed into a 16QAM constellation point modulation symbol. A total of six different constellation mapping modes are available, namely, $z=\alpha x+\beta y$, $z=\alpha x-\beta y$, $z=-\alpha x+\beta y$, $z=\beta x+\alpha y$, $z=\beta x-\alpha y$, and $z=\beta x+\alpha y$. When $\alpha$ and $\beta$ are real numbers, if the constellation mapping mode adopted by the first transmission is $z=\alpha x+\beta y$, the constellation mapping mode adopted by the second transmission may be any of the following: $z=\alpha x-\beta y$ and $z=-\alpha x+\beta y$. This ensures that the data with different priorities in the same group of data is allocated different modulation factors during the two transmissions. In this way, the first group of optimized combinations may be obtained. The two transmissions adopt any one of the combinations shown in formula [1]. The sequence of the two constellation mapping modes in each combination adopted by the two transmissions may be changed.

$$\text{Combination 1: } \begin{cases} z_1 = \alpha x + \beta y \\ z_2 = \alpha x - \beta y \end{cases} \quad [1]$$

$$\text{combination 2: } \begin{cases} z_1 = \alpha x + \beta y \\ z_2 = -\alpha x + \beta y \end{cases}$$

The first optimized hierarchical modulation solution is proposed based on the fact that $\alpha$ and $\beta$ are real numbers. Traditional constellation mapping modes require that $\alpha$ and $\beta$ should be real numbers. In the 3rd Generation Partnership Project 2 (3GPP2) standard, however, the traditional constellation mapping modes are adjusted in case of hierarchal modulation. In this case, the modulation factors $\alpha$ and $\beta$ may be complex numbers in the transmitted data symbol $z=\alpha x+\beta y$. Suppose $\alpha=|\alpha|e^{j\theta_1}$, $\beta=|\beta|e^{j\theta_2}$, $A=|\alpha|e^{j\theta_2}$, and $B=|\beta|e^{j\theta_1}$, where $|*|$ indicates the modulus of "*". For example, $$\alpha = \frac{2\sqrt{2}}{\sqrt{10}}e^{j\theta_1}, \beta = \frac{\sqrt{2}}{\sqrt{10}}e^{j\theta_2}, A = \frac{2\sqrt{2}}{\sqrt{10}}e^{j\theta_2}, \text{ and } B = \frac{2\sqrt{2}}{\sqrt{10}}e^{j\theta_1}.$$

When $\alpha$ and $\beta$ are complex numbers, if the constellation mapping mode adopted by the first transmission is $\alpha x + \beta y \triangleq |\alpha|e^{j\theta_1}x + |\beta|e^{j\theta_2}y$, the constellation mapping mode adopted by the second transmission may be $A^*x - B^*y$ or $-A^*x + B^*y$. In this way, the second group of optimized combinations is proposed as follows. Two time transmit diversities adopt any one of the combinations in formula [2]. The sequence of the two constellation mapping modes in each combination adopted by the two transmissions may be changed.

$$\text{Combination 1: } \begin{cases} z_1 = \alpha x + \beta y \triangleq |\alpha|e^{j\theta_1}x + |\beta|e^{j\theta_2}y \\ z_2 = A^*x - B^*y \triangleq |\alpha|e^{-j\theta_2}x - |\beta|e^{-j\theta_1}y \end{cases} \quad [2]$$

$$\text{Combination 2: } \begin{cases} z_1 = \alpha x + \beta y \triangleq |\alpha|e^{j\theta_1}x + |\beta|e^{j\theta_2}y \\ z_2 = -A^*x + B^*y \triangleq -|\alpha|e^{-j\theta_2}x + |\beta|e^{-j\theta_1}y \end{cases}$$

When $\alpha$ and $\beta$ are complex numbers, if the constellation mapping mode adopted by the first transmission is $\alpha x + \beta y \triangleq |\alpha|e^{j\theta_1}x + |\beta|e^{j\theta_2}y$, the constellation mapping mode adopted by the second transmission may be $Ax^* - By^*$ or $-Ax^* + By^*$. This embodiment further proposes the third group of optimized combinations as follows. Two time transmit diversities adopt any one of the combinations in formula [3]. The sequence of the two constellation mapping modes in each combination adopted by the two transmissions may be changed.

$$\text{Combination 1: } \begin{cases} z_1 = \alpha x + \beta y \triangleq |\alpha|e^{j\theta_1}x + |\beta|e^{j\theta_2}y \\ z_2 = Ax^* - By^* \triangleq |\alpha|e^{j\theta_2}x^* - |\beta|e^{j\theta_1}y^* \end{cases} \quad [3]$$

$$\text{Combination 2: } \begin{cases} z_1 = \alpha x + \beta y \triangleq |\alpha|e^{j\theta_1}x + |\beta|e^{j\theta_2}y \\ z_2 = -Ax^* + By^* \triangleq -|\alpha|e^{j\theta_2}x^* + |\beta|e^{j\theta_1}y^* \end{cases}$$

The following describes the algorithm of the signal reception technology according to the preceding three groups of optimized combinations.

For example, Combination 1 of the first group of optimized combinations may be represented by the following formula [4].

$$\begin{bmatrix} r_1 \\ r_2 \end{bmatrix} = \begin{bmatrix} \alpha h_1 & \beta h_2 \\ \alpha h_1 & -\beta h_2 \end{bmatrix} \begin{bmatrix} x \\ y \end{bmatrix} + \begin{bmatrix} n_1 \\ n_2 \end{bmatrix} = H_1 \cdot \begin{bmatrix} x \\ y \end{bmatrix} + \begin{bmatrix} n_1 \\ n_2 \end{bmatrix} \quad [4]$$

Combination 1 of the second group of optimized combinations may be represented by the following formula [5].

$$\begin{bmatrix} r_1 \\ r_2 \end{bmatrix} = \begin{bmatrix} |\alpha|e^{j\theta_1}h_1 & |\beta|e^{j\theta_2}h_2 \\ |\alpha|e^{-j\theta_2}h_1 & -|\beta|e^{-j\theta_1}h_2 \end{bmatrix} \begin{bmatrix} x \\ y \end{bmatrix} + \begin{bmatrix} n_1 \\ n_2 \end{bmatrix} = H_2 \cdot \begin{bmatrix} x \\ y \end{bmatrix} + \begin{bmatrix} n_1 \\ n_2 \end{bmatrix} \quad [5]$$

Combination 1 of the third group of optimized combinations may be represented by the following formula [6].

$$\begin{bmatrix} r_1 \\ r_2^* \end{bmatrix} = \begin{bmatrix} |\alpha|e^{j\theta_1}h_1 & |\beta|e^{j\theta_2}h_2 \\ |\alpha|e^{-j\theta_2}h_1^* & -|\beta|e^{-j\theta_1}h_2^* \end{bmatrix} \begin{bmatrix} x \\ y \end{bmatrix} + \begin{bmatrix} n_1 \\ n_2^* \end{bmatrix} = H_3 \cdot \begin{bmatrix} x \\ y \end{bmatrix} + \begin{bmatrix} n_1 \\ n_2 \end{bmatrix} \quad [6]$$

$h_i (i=1, 2)$ indicates a channel response parameter of a signal that the BS sends to the receiving end for the $i^{th}$ time. $r_i(i=1, 2)$ indicates a signal that the receiving end receives for the $i^{th}$ time. $n_i(i=1, 2)$ indicates external interference included in a signal that the receiving end receives for the $i^{th}$ time.

The receiving end detects the received signal by using a signal reception technology according to the data transmitted twice (For better description, it is assumed that the data is transmitted twice. The number of transmission times is not limited in this embodiment of the present invention). Then, the receiving end demodulates and decodes the signal. The signal reception technology includes ZF, L-MMSE, ML, SIC, and PIC.

When the ZF reception technology is used, the equalization factor $W_i(i=1, 2, 3)$ in formulas [4], [5], and [6] are represented by formula [7].

$$W_i = (H^*_i H_i)^{-1} H^*_i, (i=1, 2, 3) \quad [7]$$

where ( )* indicates a conjugation transposed matrix, and ( )$^{-1}$ indicates an inverse matrix.

Then, x and y with noise effects obtained by using the ZF reception technology may be represented by formulas [8] and [9].

Formulas [4] and [5] may be represented as $$\begin{bmatrix} \tilde{x} \\ \tilde{y} \end{bmatrix} = W_i \cdot \begin{bmatrix} r_1 \\ r_2 \end{bmatrix} = \begin{bmatrix} x \\ y \end{bmatrix} + W_i \cdot \begin{bmatrix} n_1 \\ n_2 \end{bmatrix}, \text{ where } i \text{ is equal to } 1, 2 \quad [8]$$

Formula [6] may be represented as $$\begin{bmatrix} \tilde{x} \\ \tilde{y} \end{bmatrix} = W_3 \cdot \begin{bmatrix} r_1 \\ r_2^* \end{bmatrix} = \begin{bmatrix} x \\ y \end{bmatrix} + W_3 \cdot \begin{bmatrix} n_1 \\ n_2^* \end{bmatrix} \quad [9]$$

x and y may be calculated according to formulas [7], [8], and [9]. The initial data packets may be obtained through demodulation.

When the L-MMSE reception technology is used, the equalization factor $W_i(i=1, 2, 3)$ in formulas [4], [5], and [6] are represented by formula [10].

$$W_i = (H^*_i H_i + \phi I_{2\times 2})^{-1} H^*_i, i=1, 2, 3. \quad [10]$$

$\phi = \sigma^2/P_s$, where $\sigma^2$ indicates the noise variance; $P_s$ indicates the transmit signal power; and $I_{2\times 2}$ indicates a 2×2 unit matrix.

Then, x and y with noise effects obtained by using the L-MMSE reception technology may be represented by formulas [11] and [12].

Formulas [4] and [5] may be represented as $$\begin{bmatrix} \tilde{x} \\ \tilde{y} \end{bmatrix} = W_i \cdot \begin{bmatrix} r_1 \\ r_2 \end{bmatrix}, \text{ where } i \text{ is equal to } 1, 2 \quad [11]$$

Formula [6] may be represented as $$\begin{bmatrix} \tilde{x} \\ \tilde{y} \end{bmatrix} = W_3 \cdot \begin{bmatrix} r_1 \\ r_2^* \end{bmatrix} \quad [12]$$

x and y may be calculated according to formulas [10], [11], and [12]. The initial data packets may be obtained through demodulation.

Figure 5:
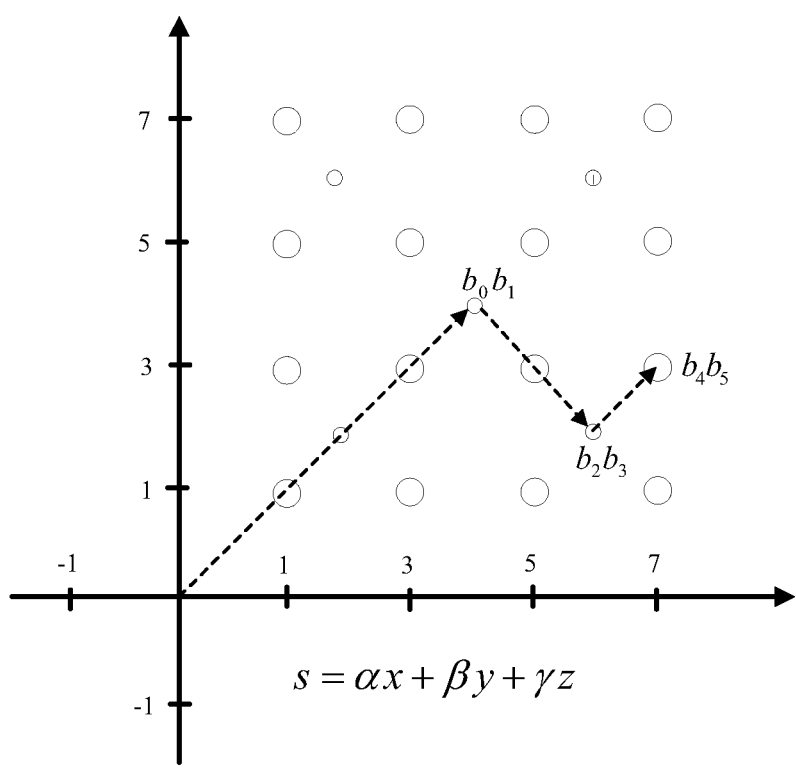
FIG. 5 is a schematic diagram illustrating the superposition of three QPSK constellation points into a 64QAM constellation point in the fourth embodiment of the present invention.

(2) 64QAM SISO Mode 1:

64QAM SISO mode 1 is used for the MBMS service during the hierarchical modulation. When the same information is sent at least three times, this mode is applied in data streams of the same service. The data streams are divided into three sub data streams with different importance levels, namely, basic layer data, intermediate layer data, and enhanced layer data. Suppose the information that the MBMS server sends to the user through the BS is $b_0 b_1 b_2 b_3 b_4 b_5$. $b_0 b_1$ indicates the encoded basic layer data and is mapped to the QPSK symbol x; $b_2 b_3$ indicates the encoded intermediate layer data and is mapped to the QPSK symbol y; $b_4 b_5$ indicates the encoded enhanced layer data and is mapped to the QPSK symbol z, which corresponds to the enhanced layer data. x, y and z are multiplied by a corresponding coefficient (assumed to be α, β, and γ, where $$\alpha = \frac{\sqrt{32}}{\sqrt{10}}, \beta = \frac{\sqrt{8}}{\sqrt{42}}, \text{ and } \gamma = \frac{\sqrt{2}}{\sqrt{42}}),$$

and then superposed into a 64QAM symbol $s = \alpha x + \beta y + \gamma z$ for transmission. The hierarchical modulation process is shown in FIG. 5.

The data transmitted multiple times is equalized through the channel. After the data is demodulated and decoded, the data at each layer is obtained.

The modulation factors transmitted three times may be any combination of modulation factors in Table 1. However, the transmission matrix must be nonsingular.

TABLE 1

| Number of transmissions | Low order constellation point | | |
|---|---|---|---|
| | x | y | z |
| | Modulation factor | | |
| First transmission | ±α | ±β | ±γ |
| Second transmission | ±α | ±β | ±γ |
| Third transmission | ±α | ±β | ±γ |

The transmission matrix after three times of transmission may be represented by formula [3].

$$\begin{bmatrix} r_1 \\ r_2 \\ r_3 \end{bmatrix} = \begin{bmatrix} h_1 & 0 & 0 \\ 0 & h_2 & 0 \\ 0 & 0 & h_3 \end{bmatrix} \begin{bmatrix} \pm\alpha & \pm\beta & \pm\gamma \\ \pm\gamma & \pm\alpha & \pm\beta \\ \pm\beta & \pm\gamma & \pm\alpha \end{bmatrix} \begin{bmatrix} x \\ y \\ z \end{bmatrix} + \begin{bmatrix} n_1 \\ n_2 \\ n_3 \end{bmatrix} \triangleq H \cdot \begin{bmatrix} x \\ y \\ z \end{bmatrix} + \begin{bmatrix} n_1 \\ n_2 \\ n_3 \end{bmatrix} \quad [13]$$

where $r_i$ (i=1, 2, 3) indicates the signal received at the $i^{th}$ time; $h_i$ (i=1, 2, 3) indicates a channel related parameter at the $i^{th}$ reception and is obtained by using pilot signals; the matrix nonsingular is 3 in case of three times of transmission. $n_i$ (i=1, 2, 3) indicates the noise interference when the signal is received for the $i^{th}$ time; $n_i$ (i=1, 2, 3) indicates the Gauss noise of which the mean value is 0 and $$E\{|n_i|^2\} = \frac{N_0}{2} \ (i = 1, 2, 3),$$

where $E\{*\}$ indicates the mathematical expected value of "*";

$$\frac{N_0}{2}$$

indicates the noise power; x, y, and z indicate QPSK constellation symbols with the amplitude value of 1, and |x|=|y|=|z|=1; the modulation factors of x, y, and z are $\alpha$, $\beta$, and $\gamma$ respectively; $\triangleq$ indicates the definition.

Formula [13] may be regarded as virtual multi-antenna reception. The channel equalization may be performed with reception technologies such as ZF and L-MMSE. Upon the channel equalization, formula [13] may be represented by the following formula [14].

$$\begin{bmatrix} \hat{x} \\ \hat{y} \\ \hat{z} \end{bmatrix} = W \cdot \begin{bmatrix} r_1 \\ r_2 \\ r_3 \end{bmatrix} = \begin{bmatrix} x \\ y \\ z \end{bmatrix} + W \cdot \begin{bmatrix} n_1 \\ n_2 \\ n_3 \end{bmatrix} \quad [14]$$

where W indicates the equilibrium factor matrix.

For example, if the L-MMSE equilibrium algorithm is used, the equilibrium factor matrix W is represented by $W=[H'H+\alpha I_3]^{-1}H'$, where $\alpha=\sigma^2/P_s$, where $\alpha$ indicates the noise variance and $P_s$ indicates the transmit signal power. If the ZF equilibrium algorithm is used, the equilibrium factor matrix W is represented by $W=[H'H]^{-1}H'$.

Upon the equalization, the estimated signals of x, y, and z are obtained. Then, these signals undergo QPSK demodulation and decoding, and the received data is obtained.

Thus, information bits of three layer data are obtained. The receiving end with the highest SNR can receive three layer information corresponding to x, y and z properly. The receiving end with a higher SNR can receive two layer information corresponding to x and y. The receiving end with a smaller SNR can only receive the information corresponding to the basic layer x.

(3) 64QAM SISO Mode 2

Figure 6:
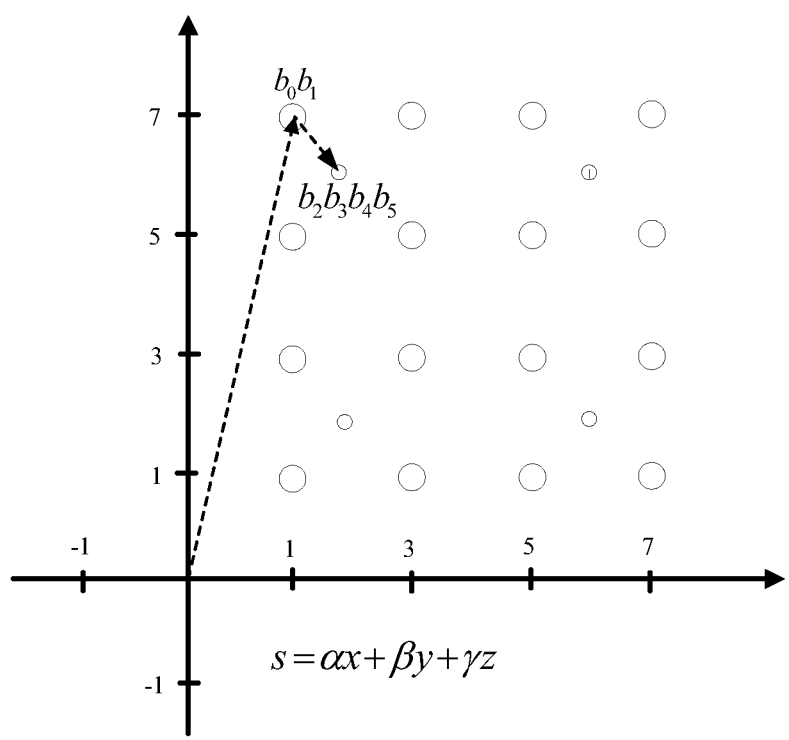
FIG. 6 is a schematic diagram illustrating the superposition of one QPSK constellation point and one 16QAM constellation point into a 64QAM constellation point in the fourth embodiment of the present invention.

In 64QAM SISO mode 2, a 64QAM constellation point adopts two layer modulation, where the basic layer adopts QPSK modulation and the enhanced layer adopts 16QAM modulation. Suppose that $b_0 b_1$ indicates the encoded basic layer data and is mapped to the QPSK symbol, and that x $b_2 b_3 b_4 b_5$ indicates the encoded enhanced layer data and is mapped to the 16QAM symbol y+z. x, y and z are multiplied by a corresponding coefficient (assumed to be $\alpha$, $\beta$, and $\gamma$, where $$\alpha = \frac{\sqrt{32}}{\sqrt{10}}, \beta = \frac{\sqrt{8}}{\sqrt{42}}, \text{ and } \gamma = \frac{\sqrt{2}}{\sqrt{42}}),$$

and then superposed into a 64QAM symbol $s=\alpha x+\beta y+\gamma z$ for transmission. The hierarchical modulation process is shown in FIG. 6.

The data transmitted twice may be any combination shown in table 2. However, the transmission matrix must be nonsingular.

TABLE 2

| Number of transmissions | Low order constellation point | | |
| --- | --- | --- | --- |
| | x | y | z |
| | Modulation factor | | |
| First transmission | ±α | ±β | ±γ |
| Second transmission | ±α | ±β | ±γ |

Supposing the hierarchical modulation symbols transmitted twice are represented by $s_1=\alpha x+\beta y+\gamma z$ and $s_2=-\alpha x+\beta y+\gamma z$, the transmission matrix after two times of transmission may be represented by the following formula [15].

$$\begin{bmatrix} r_1 \\ r_2 \end{bmatrix} = \begin{bmatrix} h_1 & 0 \\ 0 & h_2 \end{bmatrix} \begin{bmatrix} \alpha & 1 \\ -\alpha & 1 \end{bmatrix} \begin{bmatrix} x \\ \beta y + \gamma z \end{bmatrix} + \begin{bmatrix} n_1 \\ n_2 \end{bmatrix} \triangleq \quad [15]$$

$$H \cdot \begin{bmatrix} x \\ \beta y + \gamma z \end{bmatrix} + \begin{bmatrix} n_1 \\ n_2 \end{bmatrix}$$

Upon the channel equalization, formula [15] may be represented by the following formula [16].

$$\begin{bmatrix} \hat{x} \\ \widehat{\beta y + \gamma z} \end{bmatrix} = \begin{bmatrix} x \\ \beta y + \gamma z \end{bmatrix} + W \cdot \begin{bmatrix} n_1 \\ n_2 \end{bmatrix} \quad [16]$$

where W indicates the equilibrium factor matrix.

If the L-MMSE equilibrium algorithm is used, the equilibrium factor matrix W is represented by $W=[H'H+\alpha I_3]^{-1}H'$, where $\alpha=\sigma^2/P_s$, where $\sigma^2$ indicates the noise variance and $P_s$ indicates the transmit signal power. If the ZF equilibrium algorithm is used, the equilibrium factor matrix W is represented by $W=[H'H]^{-1}H'$.

After the equalization, the estimated signal of x undergoes the QPSK demodulation and decoding, and thus the basic layer data is obtained. The estimated signal of $\beta y+\gamma z$ undergoes the QPSK demodulation and decoding, and thus the enhanced layer data is obtained. When $\beta y+\gamma z$ is demodulated, the power adjustment may be performed, that is, the 16QAM adjustment may be performed on $\lambda \cdot (\beta y+\gamma z)$, where $\lambda$ indicates the power adjustment factor.

(4) 16QAM Multiple-Input Multiple-Output (MIMO) Mode 1

In 16QAM MIMO mode, the MBMS server sends information to the receiving end through the BS. If the CRC data added at the MAC layer undergoes the FEC coding at a certain point of time, the data to be transmitted at antenna 1 and antenna 2 is $b_0b_1b_2b_3$ and $b_4b_5b_6b_7$, where $b_0b_1$ and $b_4b_5$ are mapped to the QPSK constellation point modulation symbols $x_1$ and $x_2$; $b_2b_3$ and $b_6b_7$ are mapped to the QPSK constellation point modulation symbols $y_1$ and $y_2$; the modulation factors of $x_1$ and $y_1$ are $\alpha$ and $\beta$, which are superposed into a 16QAM constellation point modulation symbol for transmission at antenna 1; the modulation factors of $x_2$ and $y_2$ are $\alpha$ and $\beta$, which are superposed into a 16QAM constellation point modulation symbol for transmission at antenna 2. Certainly, $x_1$ and $y_1$ may be transmitted at antenna 2, and $x_2$ and $y_2$ may be transmitted at antenna 1. A group of data transmitted at antenna 1 and antenna 2 may be modulated by using respective constellation mapping modes. If antenna 1 and antenna 2 adopt mode 1 as the constellation mapping mode on the first time diversity, the details are shown in Table 3.

When $\alpha$ and $\beta$ are complex numbers, $\alpha=|\alpha|e^{j\theta_1}$, $\beta=|\beta|e^{j\theta_2}$, $A=|\alpha|e^{j\theta_2}$, and $B=|\beta|e^{j\theta_1}$, where $|*|$ indicates the modulus of "*". For example, $$\alpha = \frac{2\sqrt{2}}{\sqrt{10}}e^{j\theta_1}, \beta = \frac{\sqrt{2}}{\sqrt{10}}e^{j\theta_2}, A = \frac{2\sqrt{2}}{\sqrt{10}}e^{j\theta_2}, \text{ and } B = \frac{2\sqrt{2}}{\sqrt{10}}e^{j\theta_1}.$$

Similarly to the SISO system, the optimized combination when $\alpha$ and $\beta$ are complex numbers is shown in Table 2.

TABLE 3

| Antenna pair | Mode 1 | Mode 2 | Mode 3 | Mode 4 | Mode 5 |
|---|---|---|---|---|---|
| | | | Mode | | |
| Antenna 1 | $z_1 = \alpha x_1 + \beta y_1$ | $z_1 = -\alpha x_1 + \beta y_1$ | $z_1 = \alpha x_1 - \beta y_1$ | $z_1 = -\alpha x_1 + \beta y_1$ | $z_1 = \alpha x_1 - \beta y_1$ |
| Antenna 2 | $z_2 = \alpha x_2 + \beta y_2$ | $z_2 = -\alpha x_2 + \beta y_2$ | $z_2 = \alpha x_2 - \beta y_2$ | $z_2 = \alpha x_2 - \beta y_2$ | $z_2 = -\alpha x_2 + \beta y_2$ |

| Antenna pair | Mode 6 | Mode 7 | Mode 8 | Mode 9 |
|---|---|---|---|---|
| | | Mode | | |
| Antenna 1 | $z_1 = -\alpha x_2 + \beta y_2$ | $z_1 = \alpha x_2 - \beta y_2$ | $z_1 = \alpha x_2 - \beta y_2$ | $z_1 = -\alpha x_2 + \beta y_2$ |
| Antenna 2 | $z_2 = -\alpha x_1 + \beta y_1$ | $z_2 = \alpha x_1 - \beta y_1$ | $z_2 = -\alpha x_1 + \beta y_1$ | $z_2 = \alpha x_1 - \beta y_1$ |

As shown in FIG. 3, mode 2 to mode 9 indicate all the constellation mapping modes adopted by antenna 1 and antenna 2 on the second time diversity. Mode 2 to mode 5 are given when $x_1$ and $y_1$ are still transmitted at antenna 1 on the second time diversity and $x_2$ and $y_2$ are transmitted at antenna 2. Mode 6 to mode 9 are given when $x_1$ and $y_1$ are transmitted at antenna 2 on the second time diversity and $x_2$ and $y_2$ are transmitted at antenna 1. Mode 2 to mode 9 are based on the fact that $\alpha$ and $\beta$ are real numbers. A first group of optimized combinations is provided in this embodiment when $\alpha$ and $\beta$ are real numbers. Antenna 1 and antenna 2 adopt mode 1 as the constellation mapping mode on the first time diversity.

As shown in FIG. 4, mode 2 to mode 9 indicate all the constellation mapping modes adopted by antenna 1 and antenna 2 on the second time diversity. Mode 2 to mode 5 are given when $x_1$ and $y_1$ are still transmitted at antenna 1 on the second time diversity and $x_2$ and $y_2$ are transmitted at antenna 2. Mode 6 to mode 9 are given when $x_1$ and $y_1$ are transmitted at antenna 2 on the second time diversity and $x_2$ and $y_2$ are transmitted at antenna 1. Antenna 1 and antenna 2 adopt mode 1 as the constellation mapping mode on the first time diversity. Antenna 1 and antenna 2 adopt any one of mode 2 to mode 9 of conjugated $\alpha$ and $\beta$ as the constellation mapping mode on the second time diversity.

TABLE 4

| Antenna pair | Mode 1 | Mode 2 | Mode 3 | Mode 4 | Mode 5 |
|---|---|---|---|---|---|
| | | | Mode | | |
| Antenna 1 | $z_1 = \alpha x_1 + \beta y_1$ | $z_1 = -Ax_1 + By_1$ | $z_1 = Ax_1 - By_1$ | $z_1 = -Ax_1 + By_1$ | $z_1 = Ax_1 - By_1$ |
| Antenna 2 | $z_2 = \alpha x_2 + \beta y_2$ | $z_2 = -Ax_2 + By_2$ | $z_2 = Ax_2 - By_2$ | $z_2 = Ax_2 - By_2$ | $z_2 = -Ax_2 + By_2$ |

| Antenna pair | Mode 6 | Mode 7 | Mode 8 | Mode 9 |
|---|---|---|---|---|
| | | Mode | | |
| Antenna 1 | $z_1 = -Ax_2 + By_2$ | $z_1 = Ax_2 - By_2$ | $z_1 = Ax_2 - By_2$ | $z_1 = -Ax_2 + By_2$ |
| Antenna 2 | $z_2 = -Ax_1 + By_1$ | $z_2 = Ax_1 - By_1$ | $z_2 = -Ax_1 + By_1$ | $z_2 = Ax_1 - By_1$ |

Note:
$\alpha = |\alpha|e^{j\theta_1}$
$\beta = |\beta|e^{j\theta_2}$
$A = |\alpha|e^{j\theta_2}$
$B = |\beta|e^{j\theta_1}$ Antenna 1 and antenna 2 adopt any one of mode 2 to mode 9 as the constellation mapping mode on the second time diversity. The sequence of two groups of modes may be changed during the two transmissions.

Similarly, as shown in table 2, the third group of optimized combinations provided in this embodiment is as follows. Antenna 1 and antenna 2 adopt mode 1 as the constellation mapping mode on the first time diversity. Antenna 1 and antenna 2 adopt any one of mode 2 to mode 9 of conjugated $x_1$, $y_1$, $x_2$, and $y_2$ as the constellation mapping mode on the second time diversity.

The following describes two processing solutions for the receiving end based on the combination of mode 1 and mode 7 when α and β are complex numbers.

A first processing solution will be described. The signal received for the first time may be represented by formula [17].

$$\begin{cases} r_{11} = h_{11}^1(\alpha x_1 + \beta y_1) + h_{21}^1(\alpha x_2 + \beta y_2) + n_1^1 \\ r_{21} = h_{12}^1(\alpha x_1 + \beta y_1) + h_{22}^1(\alpha x_2 + \beta y_2) + n_2^1 \end{cases} \quad [17]$$

In formula [17], $n_i^j$ indicates the interference and noise of the $i^{th}$ receiving antenna when the $i^{th}$ receiving antenna receives the signal for the $j^{th}$ time. According to the existing noise theory model, it is assumed that $n_i^j$ indicates a Gauss noise of which the mean value is 0 and $$E\{|n_i^j|^2\} = \frac{N_0}{2},$$

where $E\{*\}$ indicates a mathematical expected value of "*".

$$\frac{N_0}{2}$$

indicates the noise power; $h_{ij}^n$ indicates the channel transmission function from the $i^{th}$ transmitting antenna to the $j^{th}$ receiving antenna on the $n^{th}$ transmit diversity branch; x and y indicate the QPSK modulation symbols of which the amplitude is 1, where $|x|=|y|=1$.

The modulation factors of x and y are a α and β, where α and β may be real numbers or complex numbers. When α and β are real numbers, the first group of optimized combinations is used. The following describes the reception principle of the first group of optimized combinations. From the mathematical perspective, the real number is a special form of a complex number. $\alpha=|\alpha|e^{j\Theta_1}$ and $\beta=|\beta|e^{j\Theta_2}$. When $\theta_1$ and $\theta_2$ are $k\pi$, $k \in Z$, $A=A^*=\pm\alpha$ and $B=B^*=\pm\beta$ are real numbers. The following describes the reception principles of the preceding two optimized hierarchical modulation solutions by taking the unified representation form of $\alpha=|\alpha|e^{j\Theta_1}$ and $\beta=|\beta|e^{j\Theta_2}$ as an example.

According to the reception principle in the SISO system, after the data packets sent by the two transmit diversity branches in formula [17] undergo the signal detection, formula [18] may be obtained.

$$\begin{cases} \widetilde{\alpha x_1 + \beta y_1} = \alpha x_1 + \beta y_1 + f_1(n_1, n_2 \ldots) \overset{\Delta}{=} |\alpha|e^{j\theta_1}x_1 + |\beta|e^{j\theta_2}y_1 + f_1(n_1, n_2 \ldots) \\ \widetilde{\alpha x_2 + \beta y_2} = \alpha x_2 + \beta y_2 + f_2(n_1, n_2 \ldots) \overset{\Delta}{=} |\alpha|e^{j\theta_1}x_2 + |\beta|e^{j\theta_2}y_2 + f_2(n_1, n_2 \ldots) \end{cases} \quad [18]$$

In formula [18], $f_N(n_1, n_2 \ldots)(N=1,2)$ indicates the function of $n_1$, $n_2$, and other related parameters, such as $x_1$, $y_1$, $x_2$, and $y_2$.

For the data packets transmitted at two antennas on the second time diversity, if mode 7 is used, the information received by the receiving end may be represented by formula [19].

$$\begin{cases} r_{12} = h_{11}^2(A^* x_2 - B^* y_2) + h_{21}^2(A^* x_1 - B^* y_1) + n_1^2 \\ r_{22} = h_{12}^2(A^* x_2 - B^* y_2) + h_{22}^2(A^* x_1 - B^* y_1) + n_2^2 \end{cases} \quad [19]$$

When $\theta_1$ and $\theta_2$ are $k\pi$, $k \in Z$, $A=A^*=\pm\alpha$ and $B=B^*=\pm\beta$ are real numbers.

After the data symbol in formula [19] undergoes signal detection, formula [20] is obtained.

$$\begin{cases} \widetilde{A^*x_1 - B^*y_1} = A^* x_1 - B^* y_1 + f_3(n_3, n_4 \ldots) \overset{\Delta}{=} \\ \quad |\alpha|e^{-j\theta_2}x_1 - |\beta|e^{-j\theta_1}y_1 + f_3(n_3, n_4 \ldots) \\ \widetilde{A^*x_2 - B^*y_2} = A^* x_2 - B^* y_2 + f_4(n_3, n_4 \ldots) \overset{\Delta}{=} \\ \quad |\alpha|e^{-j\theta_2}x_2 - |\beta|e^{-j\theta_1}y_2 + f_4(n_3, n_4 \ldots) \end{cases} \quad [20]$$

In formula [20], $f_N(n_3, n_4 \ldots)(N=3,4)$ indicates the function of $n_3$, $n_4$, and other related parameters, such as $x_1$, $y_1$, $x_2$, and $y_2$.

Formula [21] and formula [22] are obtained based on formula [18] and formula [20].

$$\begin{bmatrix} \widetilde{\alpha x_1 + \beta y_1} \\ \widetilde{A^*x_1 - B^*y_1} \end{bmatrix} = \begin{bmatrix} |\alpha|e^{j\theta_1} & |\beta|e^{j\theta_2} \\ |\alpha|e^{-j\theta_2} & -|\beta|e^{-j\theta_1} \end{bmatrix} \begin{bmatrix} x_1 \\ y_1 \end{bmatrix} + \begin{bmatrix} f_1(n_1, n_2 \ldots) \\ f_3(n_3, n_4 \ldots) \end{bmatrix} \quad [21]$$

$$\begin{bmatrix} \widetilde{\alpha x_2 + \beta y_2} \\ \widetilde{A^*x_2 - B^*y_2} \end{bmatrix} = \begin{bmatrix} |\alpha|e^{j\theta_1} & |\beta|e^{j\theta_2} \\ |\alpha|e^{-j\theta_2} & -|\beta|e^{-j\theta_1} \end{bmatrix} \begin{bmatrix} x_2 \\ y_2 \end{bmatrix} + \begin{bmatrix} f_2(n_1, n_2 \ldots) \\ f_4(n_3, n_4 \ldots) \end{bmatrix} \quad [22]$$

After signal detection in formula [21] and formula [22], $x_1$, $y_1$, $x_2$, and $y_2$ may be obtained.

A second processing solution will now be described. For the data packets transmitted at the two antennas on the first time diversity and the second time diversity, the data symbols received by the receiving end may be used as four data symbols transmitted at a time, as shown in formula [23].

$$\begin{cases} r_{11} = h_{11}^1(\alpha x_1 + \beta y_1) + h_{21}^1(\alpha x_2 + \beta y_2) + n_1^1 \\ r_{21} = h_{12}^1(\alpha x_1 + \beta y_1) + h_{22}^1(\alpha x_2 + \beta y_2) + n_2^1 \\ r_{12} = h_{11}^2(A^* x_2 - B^* y_2) + h_{21}^2(A^* x_1 - B^* y_1) + n_1^2 \\ r_{22} = h_{12}^2(A^* x_2 - B^* y_2) + h_{22}^2(A^* x_1 - B^* y_1) + n_2^2 \end{cases} \quad [23]$$

Formula [24] may be obtained based on formula [23].

$$\begin{bmatrix} r_{11} \\ r_{21} \\ r_{12} \\ r_{22} \end{bmatrix} = \begin{bmatrix} \alpha h_{11}^1 & \beta h_{11}^1 & \alpha h_{21}^1 & \beta h_{21}^1 \\ \alpha h_{12}^1 & \beta h_{12}^1 & \alpha h_{22}^1 & \beta h_{22}^1 \\ A^* h_{21}^2 & -B^* h_{21}^2 & A^* h_{11}^2 & -B^* h_{11}^2 \\ A^* h_{22}^2 & -B^* h_{22}^2 & A^* h_{12}^2 & -B^* h_{12}^2 \end{bmatrix} \begin{bmatrix} x_1 \\ y_1 \\ x_2 \\ y_2 \end{bmatrix} + \begin{bmatrix} n_1^1 \\ n_2^1 \\ n_1^2 \\ n_2^2 \end{bmatrix} \overset{\Delta}{=} \quad [24]$$

$$\begin{bmatrix} |\alpha|e^{j\theta_1}h_{11}^1 & |\beta|e^{j\theta_2}h_{11}^1 & |\alpha|e^{j\theta_1}h_{21}^1 & |\beta|e^{j\theta_2}h_{21}^1 \\ |\alpha|e^{j\theta_1}h_{12}^1 & |\beta|e^{j\theta_2}h_{12}^1 & |\alpha|e^{j\theta_1}h_{22}^1 & |\beta|e^{j\theta_2}h_{22}^1 \\ |\alpha|e^{-j\theta_1}h_{21}^2 & -|\beta|e^{-j\theta_2}h_{21}^2 & |\alpha|e^{-j\theta_1}h_{11}^2 & -|\beta|e^{-j\theta_2}h_{11}^2 \\ |\alpha|e^{-j\theta_1}h_{22}^2 & -|\beta|e^{-j\theta_2}h_{22}^2 & |\alpha|e^{-j\theta_1}h_{12}^2 & -|\beta|e^{-j\theta_2}h_{12}^2 \end{bmatrix} \begin{bmatrix} x_1 \\ y_1 \\ x_2 \\ y_2 \end{bmatrix} + \begin{bmatrix} n_1^1 \\ n_2^1 \\ n_1^2 \\ n_2^2 \end{bmatrix}$$

After the signal detection is performed, $x_1$, $y_1$, $x_2$, and $y_2$ with channel noise effects added may be demodulated from formula [24].

After the data symbols transmitted twice are received and buffered, $x_1$, $y_1$, $x_2$, and $y_2$ with channel noise effects added may be demodulated by using the signal reception technology, thus implementing the symbol combination at the receiving end and obtaining the received data through demodulation.

(5) 16QAM MIMO Mode 2

16QAM MIMO mode 2 is an enhanced mode of the second processing solution of 16QAM MIMO mode 1. To increase the flexibility of the transmitted signal, pre-coding matrixes $C_1$, $C_2$, $C_3$, and $C_4$ are added at the transmitting end. The data received by the receiving end is shown in formula [25].

$$\begin{bmatrix} r_{11} \\ r_{12} \\ r_{21} \\ r_{22} \end{bmatrix} = \begin{bmatrix} \begin{bmatrix} \alpha h_{11}^1 & \alpha h_{21}^1 \\ A^* h_{21}^2 & A^* h_{11}^2 \end{bmatrix} \cdot C_1 & \begin{bmatrix} \beta h_{11}^1 & \beta h_{21}^1 \\ -B^* h_{21}^2 & -B^* h_{11}^2 \end{bmatrix} \cdot C_2 \\ \begin{bmatrix} \alpha h_{12}^1 & \alpha h_{22}^1 \\ A^* h_{22}^2 & A^* h_{12}^2 \end{bmatrix} \cdot C_3 & \begin{bmatrix} \beta h_{12}^1 & \beta h_{22}^1 \\ -B^* h_{22}^2 & -B^* h_{12}^2 \end{bmatrix} \cdot C_4 \end{bmatrix} \begin{bmatrix} x_1 \\ x_2 \\ y_1 \\ y_2 \end{bmatrix} + \begin{bmatrix} n_1^1 \\ n_1^2 \\ n_2^1 \\ n_2^2 \end{bmatrix} \quad [25]$$

The pre-coding matrixes $C_1$, $C_2$, $C_3$, and $C_4$ may be identical or different. One or multiple of the pre-coding matrixes $C_1$, $C_2$, $C_3$, and $C_4$ may be used. The pre-coding matrixes used during the two transmissions may be identical or different.

If the channel equilibrium algorithm is used in formula [25], $x_1$, $x_2$, $y_1$, and $y_2$ are obtained. After the QPSK is used to demodulate and decode $x_1$, $x_2$, $y_1$, and $y_2$, the received data may be obtained.

(6) 64QAM MIMO Mode 1

Figure 7:
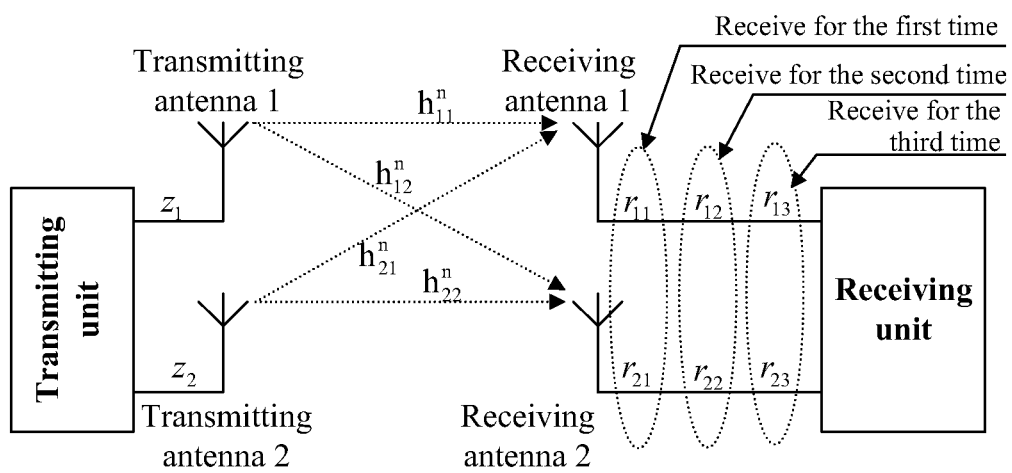
FIG. 7 is a schematic diagram illustrating the transmission and reception when a transmitting unit and a receiving unit have two antennas in multiple-input multiple-output (MIMO) mode in the fourth embodiment of the present invention.

FIG. 7 is a schematic diagram illustrating the transmission and reception when the transmitting unit and the receiving unit have two antennas. In the MIMO system with two transmitting antennas and two receiving antennas, after the data of the basic layer, the intermediate layer, and the enhanced layer undergoes the coding at a certain point of time, the information bits to be transmitted at transmitting antenna 1 and transmitting antenna 2 are $a_0a_1a_2a_3a_4a_5$ and $b_0b_1b_2b_3b_4b_5$, where $a_0a_1$ and $b_0b_1$, are mapped to the QPSK constellation point modulation symbols $x_1$ and $x_2$ and correspond to the basic layer data; $a_2a_3$ and $b_2b_3$ are mapped to the QPSK constellation point modulation symbols $y_1$ and $y_2$ and correspond to the intermediate layer data; $a_4a_5$ and $b_4b_5$ are mapped to the QPSK constellation point modulation symbols $z_1$ and $z_2$ and correspond to the enhanced layer data; the modulation factors of $x_1$, $y_1$, and $z_1$ are $\alpha$, $\beta$, and $\gamma$, which are superposed into a 64QAM constellation point modulation symbol transmitted at transmitting antenna 1; the) modulation factors of $x_2$, $y_2$, and $z_2$, and are $\alpha$, $\beta$, and $\gamma$ (or others), which are superposed into a 64QAM constellation point modulation symbol transmitted at transmitting antenna 2. Certainly, $x_1$, $y_1$, and $z_1$ may be transmitted at transmitting antenna 2, and $x_2$, $y_2$, and $z_2$ are transmitted at transmitting antenna 1. The group of data transmitted at transmitting antenna 1 and transmitting antenna 2 may be modulated according to the respective constellation mapping mode.

Supposing transmitting antenna 1 and transmitting antenna 2 transmit the same information three times, the two transmitting antennas may be combined according to respective rules, as shown in Table 1. The two transmitting antennas may have identical or different mapping rules. The hierarchical modulation symbols that transmitting antenna 1 transmits three times are $s_{11}=\alpha x+\beta y_1+\gamma z_1$, $s_{12}=\alpha x_1-\beta y_1+\gamma z_1$, and $s_{13}=\alpha x_1+\beta y_1-\gamma z_1$ respectively. The hierarchical modulation symbols that transmitting antenna 2 transmits three times are $s_{21}=\alpha x_2+\beta y_2-\gamma z_2$, $s_{22}=\alpha x_2-\beta y_2+\gamma z_2$, and $s_{23}=-\alpha x_2+\beta y_x-\gamma x_2$.

The signals that receiving antenna 1 receives three times are represented by formula [26].

$$\begin{cases} r_{11} = h_{11}^1(\alpha x_1 + \beta y_1 + \gamma z_1) + h_{21}^1(\alpha x_2 - \beta y_2 - \gamma z_2) + n_1^1 \\ r_{12} = h_{11}^2(\alpha x_1 - \beta y_1 + \gamma z_1) + h_{21}^2(\alpha x_2 - \beta y_2 + \gamma z_2) + n_1^2 \\ r_{13} = h_{11}^3(\alpha x_1 + \beta y_1 - \gamma z_1) + h_{21}^3(-\alpha x_2 + \beta y_2 - \gamma z_2) + n_1^3 \end{cases} \quad [26]$$

The signals that receiving antenna 2 receives three times are represented by formula [27].

$$\begin{cases} r_{21} = h_{12}^1(\alpha x_1 + \beta y_1 + \gamma z_1) + h_{22}^1(\alpha x_2 - \beta y_2 - \gamma z_2) + n_2^1 \\ r_{22} = h_{12}^2(\alpha x_1 - \beta y_1 + \gamma z_1) + h_{22}^2(\alpha x_2 - \beta y_2 + \gamma z_2) + n_2^2 \\ r_{23} = h_{12}^3(\alpha x_1 + \beta y_1 - \gamma z_1) + h_{22}^3(-\alpha x_2 + \beta y_2 - \gamma z_2) + n_2^3 \end{cases} \quad [27]$$

In FIG. 7, formula [26], and formula [27], $r_{ij}$ indicates the signal that the $i^{th}$ receiving antenna receives for the $j^{th}$ time; $h_{ij}^n$ indicates the channel transmission function from the $i^{th}$ transmitting antenna to the $j^{th}$ receiving antenna on the $n^{th}$ transmit diversity and is obtained by using pilot signals. $n_i^j$ in formula [26] and formula [27] indicates the interference and noise of the $i^{th}$ receiving antenna at the $j^{th}$ reception. According to the existing noise theory model, $n_i^j$ is a Gauss noise of which the mean value is 0 and $$E\{|n_i^j|^2\} = \frac{N_0}{2},$$

where $E\{*\}$ indicates the mathematical expected value of "*", and $$\frac{N_0}{2}$$

indicates the noise power.

By combining formula [26] and formula [27], the estimated signal of $s_{ij}$ ($i=1, 2, 3; j=1, 2, 3$) is obtained by using an equilibrium algorithm. Then, the estimated signals of $x_1$, $y_1$, and $z_1$ and $x_2$, $y_2$, and $z_2$ are obtained by using an equilibrium algorithm. Finally, the QPSK modulation is used to obtain the received data.

What has been described above is the MIMO system with two transmitting antennas and two receiving antennas. This embodiment is also applicable to the MIMO system with multiple transmitting antennas and multiple receiving antennas.

(7) 64QAM MIMO Mode 2

64QAM MIMO mode 2 is applicable to two transmitting antennas and two receiving antennas, and is mainly used in scenarios where the same information is transmitted twice.

The hierarchical modulation symbols transmitted by transmitting antenna 1 twice are $s_{11}=\alpha x_1+\beta y_1+\gamma z_1$ and $s_{12}=-\alpha x_1+\beta y_1+\gamma z_1$. The hierarchical modulation symbols transmitted by transmitting antenna 2 twice are $s_{21}=\alpha x_2-\beta y_2-\gamma z_2$ and $s_{22}=\alpha x_2+\beta y_2+\gamma z_2$.

The signals received by receiving antenna 1 and receiving antenna 2 are represented by formula [28].

$$\begin{cases} r_{11} = h_{11}^1(\alpha x_1+\beta y_1+\gamma z_1)+h_{21}^1(\alpha x_2-\beta y_2-\gamma z_2)+n_1^1 \\ r_{12} = h_{11}^2(-\alpha x_1+\beta y_1+\gamma z_1)+h_{21}^2(\alpha x_2+\beta y_2+\gamma z_2)+n_1^2 \\ r_{21} = h_{12}^1(\alpha x_1+\beta y_1+\gamma z_1)+h_{22}^1(\alpha x_2-\beta y_2-\gamma z_2)+n_2^1 \\ r_{22} = h_{12}^2(-\alpha x_1+\beta y_1+\gamma z_1)+h_{22}^2(\alpha x_2+\beta y_2+\gamma z_2)+n_2^2 \end{cases} \quad [28]$$

Formula [28] may be represented by formula [29].

$$\begin{bmatrix} r_{11} \\ r_{12} \\ r_{21} \\ r_{22} \end{bmatrix} = \begin{bmatrix} \alpha h_{11}^1 & \alpha h_{21}^1 & h_{11}^1 & -h_{21}^1 \\ -\alpha h_{11}^2 & \alpha h_{21}^2 & h_{11}^2 & h_{21}^2 \\ \alpha h_{12}^1 & \alpha h_{22}^1 & h_{12}^1 & -h_{22}^1 \\ -\alpha h_{12}^2 & \alpha h_{22}^2 & h_{12}^2 & h_{22}^2 \end{bmatrix} \begin{bmatrix} x_1 \\ x_2 \\ \beta y_1+\gamma z_1 \\ \beta y_2+\gamma z_2 \end{bmatrix} + \quad [29]$$

$$\begin{bmatrix} n_1^1 \\ n_1^2 \\ n_2^1 \\ n_2^2 \end{bmatrix} \stackrel{\Delta}{=} H \cdot \begin{bmatrix} x_1 \\ x_2 \\ \beta y_1+\gamma z_1 \\ \beta y_2+\gamma z_2 \end{bmatrix} + \begin{bmatrix} n_1^1 \\ n_1^2 \\ n_2^1 \\ n_2^2 \end{bmatrix}$$

If the channel equilibrium algorithm is used in formula [29], $x_1$, $x_2$, $\beta y_1+\gamma z_1$, and $\beta y_2+\gamma z_2$ are obtained. The power of $\beta y_1+\gamma z_1$ and $\beta y_2+\gamma z_2$ is adjusted to $\lambda(\beta y_1+\gamma z_1)$ and $\lambda(\beta y_2+\gamma z_2)$. Then, the QPSK demodulation is performed on $x_1$ and $x_2$. $\lambda(\beta y_1+\gamma z_1)$ and $\lambda(\beta y_2+\gamma z_2)$ are demodulated by using the 16QAM, and are further decoded into received data.

(8) 64QAM MIMO Mode 3

64QAM MIMO mode 3 is an enhanced mode of 64QAM MIMO mode 2. To increase the flexibility of the transmitted signal, pre-coding matrixes $C_1$, $C_2$, $C_3$, and $C_4$ are added at the transmitting end. The data received by the receiving end is shown in formula [30].

$$\begin{bmatrix} r_{11} \\ r_{12} \\ r_{21} \\ r_{22} \end{bmatrix} = \begin{bmatrix} \alpha \cdot \begin{bmatrix} h_{11}^1 & h_{21}^1 \\ -h_{11}^1 & \alpha h_{21}^1 \end{bmatrix} \cdot C_1 & \begin{bmatrix} h_{11}^1 & -h_{21}^1 \\ h_{11}^1 & h_{21}^1 \end{bmatrix} \cdot C_2 \\ -\alpha \cdot \begin{bmatrix} h_{12}^1 & h_{22}^1 \\ h_{12}^1 & \alpha h_{22}^1 \end{bmatrix} \cdot C_3 & \begin{bmatrix} h_{12}^1 & -h_{22}^1 \\ h_{12}^1 & h_{22}^1 \end{bmatrix} \cdot C_4 \end{bmatrix} \begin{bmatrix} x_1 \\ x_2 \\ \beta y_1+\gamma z_1 \\ \beta y_2+\gamma z_2 \end{bmatrix} + \quad [30]$$

$$\begin{bmatrix} n_1^1 \\ n_2^1 \\ n_1^2 \\ n_2^2 \end{bmatrix} \stackrel{\Delta}{=} H \cdot \begin{bmatrix} x_1 \\ x_2 \\ \beta y_1+\gamma z_1 \\ \beta y_2+\gamma z_2 \end{bmatrix} + \begin{bmatrix} n_1^1 \\ n_2^1 \\ n_1^2 \\ n_2^2 \end{bmatrix}$$

The pre-coding matrixes $C_1$, $C_2$, $C_3$, and $C_4$ may be identical or different. One or multiple of the pre-coding matrixes $C_1$, $C_2$, $C_3$, and $C_4$ may be used. The pre-coding matrixes used during the two transmissions may be identical or different.

If the channel equilibrium algorithm is used in formula [30], $x_1$, $x_2$, $\beta y_1+\gamma z_1$, and $\beta y_2+\gamma z_2$ are obtained. The power of $\beta y_1+\gamma z_1$ and $\beta y_2+\gamma z_2$ is adjusted to $\lambda(\beta y_1+\gamma z_1)$ and $\lambda(\beta y_2+\gamma z_2)$. Then, the QPSK demodulation is performed on $x_1$ and $x_2$. $\lambda(\beta y_1+\gamma z_1)$ and $\lambda(\beta y_2+\gamma z_2)$ are demodulated by using the 16QAM, and are further decoded into received data.

The fifth embodiment of the present invention describes a data transmission process and a data reception process in a multi-receiving-end communication system with multiple transmitting antennas and a single receiving antenna. When multiple receiving ends access the BS, the signal sent by a receiving end with a strong receiving capability is received as a strong signal, and the signal sent by a receiving end with a weak receiving capability is received by the BS as a poor signal. This avoids additional interference signals.

Figure 8:
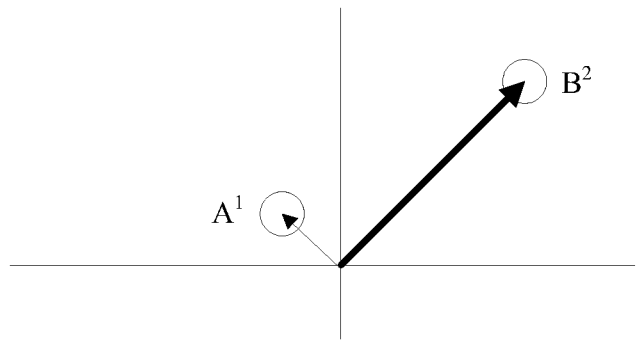
FIG. 8 is a schematic diagram illustrating the mapping of data transmitted by two receiving ends to QPSK constellation points in a fifth embodiment of the present invention.
Figure 9:
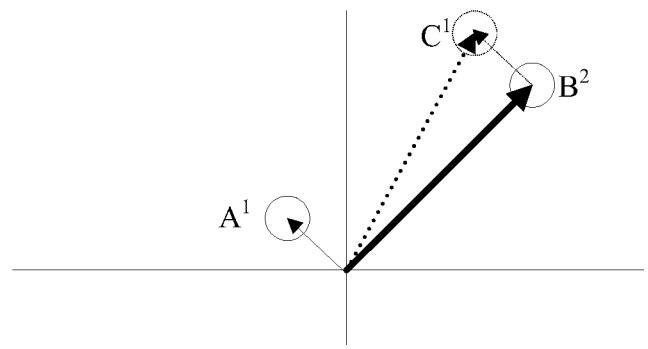
FIG. 9 is a schematic diagram illustrating the superposition of QPSK symbols transmitted by two receiving ends into a 16QAM constellation point in a channel in the fifth embodiment of the present invention.

Multiple receiving ends request to access the BS through the uplink channel. The BS permits the access according to actual situation, and allocates time frequency resources for the receiving ends through downlink signaling messages. The BS selects two or multiple receiving ends as a group in which the receiving ends send data in the same time frequency resource. That is, multiple receiving ends share the channel resources in the time domain, frequency domain, and code domain. For example, in a code division multiple access (CDMA) system, when multiple receiving ends access a sector of the BS, these receiving ends share the resources in the system through code division. The receiving ends in the same group send signals by using different transmit power according to the instruction of the BS. Supposing the BS schedules $WT_1$ and $WT_2$ to send signals in the same time frequency resource. $WT_1$ and $WT_2$ feed back channel gains $h_1$ and $h_2$ to the BS respectively, where $|h_1|<1$, $|h_2|<1$, and $|*|$ indicate the modulo operation of "*". The BS pre-adjusts the transmit power parameter $\alpha$ of $WT_1$ through the downlink channel to increase the receive power of $WT_1$ at the BS end. In addition, the BS pre-adjusts the power parameter $\beta$ of $WT_2$ to lower the receive power of $WT_2$ at the BS end. That is, the adjusted signal power meets the following condition: $|\alpha h_1|>|\beta h_2|$. The signals sent by the receiving ends in the same group are superposed through the air channel. Supposing two receiving ends (represented by $WT_1$ and $WT_2$) adopt the QPSK, the signals sent by $WT_1$ and $WT_2$ upon the power adjustment are modulated to the constellation points $B^2$ and $A^1$ and correspond to symbols x and y, as shown in FIG. 8. The signals superposed through the air channel are shown in FIG. 9. $B^2$ and $A^1$ are superposed into a constellation point $C^1$, that is, the two receiving ends send $\alpha x$ and $\beta y$ respectively. The BS receives the superposed signal. Taking the preceding two receiving ends as an example, the signal $r_i$ received by the BS is $r_i=(\alpha h_1)x+(\beta h_2)y$. When the signal is incorrectly received by the BS, the BS initiates the transmission for the second time. When the channel conditions vary slightly, the BS tries to schedule the receiving ends that are previously scheduled in the same group to the same group for transmission. However, this transmission adopts a modulation mode that has a fixed relationship with the modulation mode adopted by the first transmission. The two modulation modes form a preset optimized combination of modulation modes. Taking two receiving ends as an example, this transmission adopts $-\alpha$ or $-\beta$, and the receiving end is one of the following: $r_2=-(\alpha h_1)x+(\beta h_2)y+n_2$ and $r_2=(\alpha k)x-(\beta h_2)y+n_2$. $\alpha$ and $\beta$ indicate the power adjustment parameters during the second transmission. $h_1$ and $h_2$ indicate the channel gains during the second transmission. Because the interval between the two transmissions is very short, the channel parameters remain unchanged. n1 and n2 indicate the interference and noise. The BS detects the received signal by using the signal reception technology according to the data transmitted twice. Then, the received signal is demodulated into initial data packets. The signal received by the BS is represented by one of formula [31] and formula [32].

$$\begin{bmatrix} r_1 \\ r_2 \end{bmatrix} = \begin{bmatrix} \alpha h_1 & \beta h_2 \\ \alpha h_1 & -\beta h_2 \end{bmatrix} \begin{bmatrix} x \\ y \end{bmatrix} + \begin{bmatrix} n_1 \\ n_2 \end{bmatrix} \quad [31]$$

$$\begin{bmatrix} r_1 \\ r_2 \end{bmatrix} = \begin{bmatrix} \alpha h_1 & \beta h_2 \\ -\alpha h_1 & \beta h_2 \end{bmatrix} \begin{bmatrix} x \\ y \end{bmatrix} + \begin{bmatrix} n_1 \\ n_2 \end{bmatrix} \quad [32]$$

Formula [31] and formula [32] are applicable to a first group of optimized combinations, that is, when $\alpha$ and $\beta$ are complex numbers. When $\alpha$ and $\beta$ are complex numbers, $\alpha=|\alpha|e^{j\theta_1}$, $\beta=|\beta|e^{j\theta_2}$, $A=|\alpha|e^{j\theta_2}$, and $B=|\beta|e^{j\theta_1}$, where |*| indicates the modulus of "*", a second group of optimized combinations is obtained. If $WT_1$ and $WT_2$ send symbols $\alpha x$ and $\beta y$ for the first time, the signal received by the BS is $r_1=(\alpha h_1)x+(\beta h_2)y \triangleq (|\alpha|e^{j\theta_1}h_1)x+(|\beta|e^{j\theta_2}h_2)y$. The BS receives signals from the two receiving ends. When the BS notifies the two receiving ends of sending for the second time through a signaling message, the symbols sent by $WT_1$ and $WT_2$ are one of the following combinations: (A*x, −B*y) and (−A*x, B*y), that is, $(|\alpha|e^{-j\theta_2}x, -|\beta|e^{-j\theta_1}y)$ and $(-|\alpha|e^{-j\theta_2}x, |\beta|e^{-j\theta_1}y)$. In addition, $WT_1$ and $WT_2$ notify the BS of specific modulation factors through their respective control signaling or transmit specific modulation factors according to a pre-agreed mode. The signals that the BS receives from the two receiving ends may be represented by one of formula [33] and formula [34].

$$\begin{bmatrix} r_1 \\ r_2 \end{bmatrix} = \begin{bmatrix} |\alpha|e^{j\theta_1}h_1 & |\beta|e^{j\theta_2}h_2 \\ |\alpha|e^{-j\theta_2}h_1 & -|\beta|e^{-j\theta_1}h_2 \end{bmatrix} \begin{bmatrix} x \\ y \end{bmatrix} + \begin{bmatrix} n_1 \\ n_2 \end{bmatrix} \quad [33]$$

$$\begin{bmatrix} r_1 \\ r_2 \end{bmatrix} = \begin{bmatrix} |\alpha|e^{j\theta_1}h_1 & |\beta|e^{j\theta_2}h_2 \\ -|\alpha|e^{-j\theta_2}h_1 & |\beta|e^{-j\theta_1}h_2 \end{bmatrix} \begin{bmatrix} x \\ y \end{bmatrix} + \begin{bmatrix} n_1 \\ n_2 \end{bmatrix} \quad [34]$$

Similarly, when $\alpha$ and $\beta$ are complex numbers, a third group of optimized combinations is obtained. If symbols that $WT_1$ and $WT_2$ send for the first time are $\alpha x$ and $\beta y$, that is, the combination ($\alpha x$, $\beta y$) of symbols transmitted for the first time, the signal received by the BS is $r_1=(\alpha h_1)x+(\beta h_2)y \triangleq (|\alpha|e^{j\theta_1}h_1)x+(|\beta|e^{j\theta_2}h_2)y$. The BS receives signals from two receiving ends. When the BS notifies the two receiving ends of sending for the second time through a signaling message, the symbols sent by $WT_1$ and $WT_2$ are one of the following combinations: (Ax*, −By*) and (−Ax*, By*), that is, $(|\alpha|e^{j\theta_2}x^*, -|\beta|e^{-j\theta_1}y^*)$ and $(-|\alpha|e^{j\theta_2}x^*, |\beta|e^{j\theta_1}y^*)$. In addition, $WT_1$ and $WT_2$ notify the BS of specific modulation factors through their respective control signaling. The signals that the BS receives from the two receiving ends may be represented by one of formula [35] and formula [36].

$$\begin{bmatrix} r_1 \\ r_2^* \end{bmatrix} = \begin{bmatrix} |\alpha|e^{j\theta_1}h_1 & |\beta|e^{j\theta_2}h_2 \\ |\alpha|e^{-j\theta_2}h_1^* & -|\beta|e^{-j\theta_1}h_2^* \end{bmatrix} \begin{bmatrix} x \\ y \end{bmatrix} + \begin{bmatrix} n_1 \\ n_2^* \end{bmatrix} \quad [35]$$

$$\begin{bmatrix} r_1 \\ r_2^* \end{bmatrix} = \begin{bmatrix} |\alpha|e^{j\theta_1}h_1 & |\beta|e^{j\theta_2}h_2 \\ -|\alpha|e^{-j\theta_2}h_1^* & |\beta|e^{-j\theta_1}h_2^* \end{bmatrix} \begin{bmatrix} x \\ y \end{bmatrix} + \begin{bmatrix} n_1 \\ n_2^* \end{bmatrix} \quad [36]$$

In formula [31] to formula [36], signals may be detected by using the signal reception technology. The detected signals may be demodulated into initial data packets.

The sixth embodiment of the present invention describes a data transmission process in a multi-user combined mapping system. According to the multi-user combined mapping principle, the hierarchical modulation principle is used to multiplex a local user and a remote user in the same time domain, frequency domain, and code domain, thus increasing the system capacity. The local user is the user close to the BS with good channel conditions, and is generally the central user in the cell. The remote user is a user far from the BS with poor channel conditions, and is generally an edge user of the cell. To increase the spectrum utilization of the system, the information sent to the local user and the remote user is modulated into a high order constellation point in hierarchical mode, so that the data of multiple users is mapped to the same time frequency resource. When multiple receiving end users incorrectly receive the information, the users notify the BS of sending signals for the second time through the uplink channel. The second modulation mode adopted when the BS sends the data of the combined mapping users for the second time and the first modulation mode form a preset optimized combination of modulation modes. The modulation factors of the two modulation modes comply with the preset modulation factor mapping relationship and/or the constellation modulation symbols of the two modulation modes comply with the preset constellation modulation symbol mapping relationship. The signals received multiple times (at least twice) are combined at the receiving end and detected by using the signal reception technology.

The specific process is as follows: The BS classifies multiple users (the preferred number of users is two) into a group according to information such as an uplink channel instruction. The receiving ends in this group include a local user and a remote user. The BS scheduler maps the users in a group to a high order constellation point. It is assumed that two users (including a local user and a remote user) are allocated to a group. The information sent to the remote user is $b_2 b_3$, and the data sent to the local user is $b_0 b_1$. Because the remote user has poor channel conditions, the remote user corresponds to the basic layer of the hierarchical modulation. Because the local user has good channel conditions, the local user corresponds to the enhanced layer of the hierarchical modulation. $b_0 b_1$ is mapped as a QPSK symbol x; $b_2 b_3$ is mapped as a QPSK symbol y. x and y are multiplied by the corresponding coefficients (assumed to be $\alpha$ and $\beta$, where $\alpha=|\alpha|e^{j\theta_1}$, $\beta=|\beta|e^{j\theta_2}$, $A=|\alpha|e^{j\theta_2}$, and $B=|\beta|e^{j\theta_1}$), where |*| indicates the modulus of "*". When $\theta_1$ and $\theta_2$ are $k\pi$, $k \in Z$, $A=A^*=\pm\alpha$ and $B=B^*=\pm\beta$, are complex numbers, and the information is superposed into a 16 QAM symbol $(z=\alpha x+\beta y \triangleq |\alpha|e^{j\theta_1}x+|\beta|e^{j\theta_2}y)$ for transmission. If the data in the group is incorrect, the receiving ends send a NACK through a feedback channel. When a second transmit diversity branch sends data, a second modulation mode corresponding to a first modulation mode used by a first transmit diversity branch is used. During the second transmission, the combination may be: A*x−B*y, −A*x+B*y, Ax*−By, or −Ax*+By*, so long as the first modulation mode and the second modulation mode comply with the preset optimized combination. The receiving ends detect the signal by using the signal reception technology according to the data transmitted twice. Then, the received signal is demodulated into initial data packets. Similarly, the SISO mode and the MIMO mode are available. The specific process is similar to that described in the fourth embodiment of the present invention, and is not further described.

Figure 10:
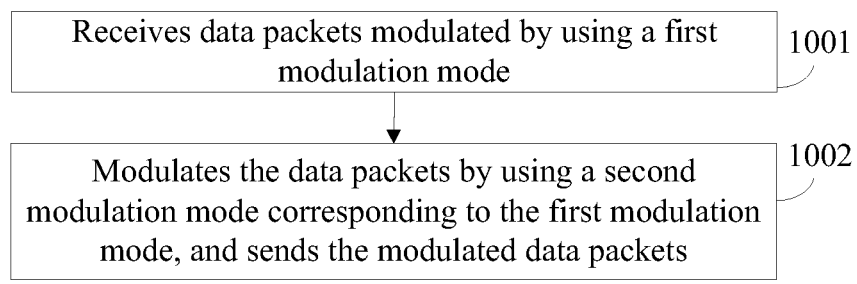
FIG. 10 is a flowchart of a method for forwarding data in a seventh embodiment of the present invention.

FIG. 10 is a flowchart of a method for forwarding data in the seventh embodiment of the present invention. The process includes step 1001 and step 1002.

Step 1001: Receives data packets modulated by using a first modulation mode;

Step 1002: Modulates the data packets by using a second modulation mode corresponding to the first modulation mode, and sends the modulated data packets;

The first modulation mode and the second modulation mode form a preset optimized combination. a first group of modulation factors that the first modulation mode adopts to modulate the data packets is different from a second group of modulation factors that the second modulation mode adopts to modulate the data packets and/or a first group of constellation modulation symbols used by the first modulation mode is different from a second group of constellation modulation symbols used by the second modulation mode. The first group of modulation factors and the second group of modulation factors comply with the preset modulation factor mapping relationship, and the first group of constellation modulation symbols and the second group of constellation modulation symbols comply with the preset constellation modulation symbol mapping relationship.

The process of sending data packets by using the second modulation mode corresponding to the first modulation mode includes obtaining the second group of modulation factors corresponding to the data packets, where the second group of modulation factors and the first group of modulation factors comply with the preset modulation factor mapping relationship; mapping the data packets to the constellation points according to the preset constellation modulation mode, and obtaining the constellation modulation symbols corresponding to the data packets; and combining the second group of modulation factors and constellation modulation symbols into a modulation combination; and sending the modulation combination.

The modulation factor mapping relationship is as follows. The first group of modulation factors and the second group of modulation factors have at least one different modulation factor; different modulation factors meet one of the following conditions: identical absolute value, mutual conjugation, and identical modulus.

The process of sending data packets by using the second modulation mode corresponding to the first modulation mode may also include obtaining the second group of modulation factors corresponding to the data packets, mapping the data packets to the constellation points according to the preset constellation modulation mode, and obtaining the second group of modulation symbols corresponding to the data packets, where the second group of constellation modulation symbols and the first group of constellation modulation symbols corresponding to the first modulation mode comply with the preset constellation modulation symbol mapping relationship; combining the second group of modulation factors and the second group of constellation modulation symbols into a modulation combination; and sending the modulation combination.

The constellation modulation symbol mapping relationship is as follows. The first group of constellation modulation factors and the second group of constellation modulation factors have at least one different constellation modulation factor; different constellation modulation factors meet one of the following conditions: identical absolute value, mutual conjugation, and identical modulus.

In this embodiment, the second group of modulation factors used by the second modulation mode during the forwarding and the first group of modulation factors used by the first modulation mode comply with the preset modulation factor mapping relationship and/or the first group of constellation modulation symbols used by the first modulation mode is different from the second group of constellation modulation symbols used by the second modulation mode. In this way, the information modulated by the second modulation mode and the information modulated by the first modulation mode may have different symbols, so that the errors such as noises (for example, the error in the second transmission and the error in the first transmission) may not be deflected in the same direction. This reduces the symbol errors of the data packets obtained by the receiving ends, reduces the frame error rate and bit error rate, improves the system performance, and increases the communication accuracy.

The eighth embodiment of the present invention describes a data forwarding process in a relay system. When data of multiple layers needs to be transmitted in the relay transmission system, the hierarchical modulation technology is used to carry data of different priorities or importance. When the BS sends signals by using the hierarchical modulation mode, if the signals are properly received by a relay station (RS), the RS forwards the signals by using a hierarchical modulation technology that has a specific relationship with the hierarchical modulation mode used by the BS. The receiving ends detect the modulation data of multiple layers by using the signal reception technology in combination with the data directly received from the BS and the data received from the RS.

For better description, the modulation of two QPSK symbols into a 16QAM symbol in hierarchical mode is taken as an example. Suppose that the BS sends the information $b_0b_1b_2b_3$ to the receiving ends through the RS. $b_0b_1$ corresponds to the basic layer data of the hierarchical modulation and is mapped as a QPSK symbol x. $b_2b_3$ corresponds to the enhanced layer data of the hierarchical modulation and is mapped as a QPSK symbol y. x and y are multiplied by the corresponding coefficients (assumed to be $\alpha$ and $\beta$, where $\alpha=|\alpha|e^{j\theta_1}$, $\beta=|\beta|e^{j\theta_2}$, $A=|\alpha|e^{j\theta_2}$, and $B=|\beta|e^{j\theta_1}$, where |*| indicates the modulus of "*". When $\theta_1$ and $\theta_2$ are $k\pi$, $k \in Z$, $A=A^*=\pm\alpha$ and $B=B^*=\pm\beta$ are complex numbers, the information is superposed into a 16QAM symbol Z ($z=\alpha x+\beta y \triangleq |\alpha|e^{j\theta_1}x+|\beta|e^{j\theta_2}y$) for transmission. When the RS receives data properly (through forwarding) but the receiving ends cannot receive the data properly, the RS forwards the received data. The modulation mode used during the relay forwarding and the modulation mode used by the BS form a preset optimized combination of modulation modes. The receiving ends detect the received signal by using the signal reception technology in combination with the signal received from the BS and the signal received from the RS. Then, the initial data packets may be obtained through demodulation.

Figure 11:
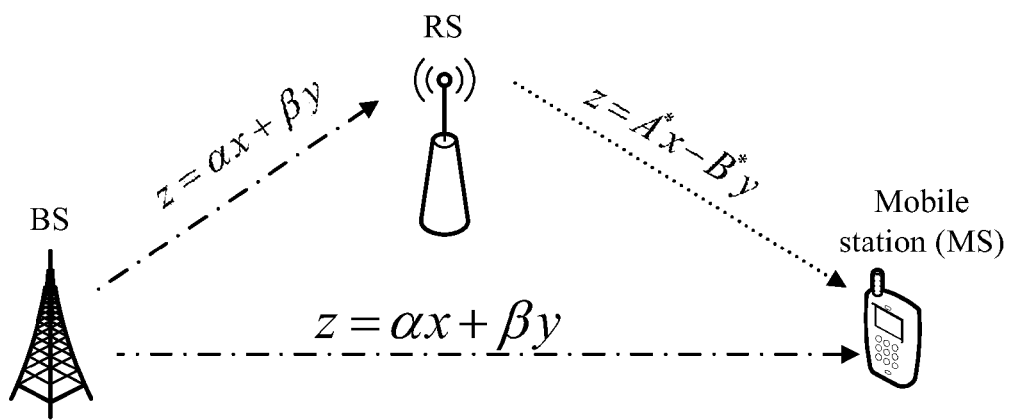
FIG. 11 is a schematic diagram illustrating the data forwarding when an RS is available in an eighth embodiment of the present invention.

As shown in FIG. 11, the specific process is as follows. The modulated information sent by a first transmit diversity branch (BS) is represented by $$z=\alpha x+\beta y \triangleq |\alpha|e^{j\theta_1}x+|\beta|e^{j\theta_2}y;$$

after receiving $$z=\alpha x+\beta y \triangleq |\alpha|e^{j\theta_1}x+|\beta|e^{j\theta_2}y,$$

a second transmit diversity branch (RS) processes and forwards the data packets; a second group of modulation factors used during the forwarding and a first group of modulation factors used by the BS comply with the preset modulation factor mapping relationship and/or a second group of constellation modulation symbols used during the forwarding and a first group of constellation modulation symbols used by the BS comply with the preset constellation modulation symbol mapping relationship. Thus, the information sent by the RS may be one of the following: A*X−B*y −A*x+B*y, Ax*−By*, and −Ax*+By*, and the receiving end may obtain the data packets according to the data sent from the RS and the BS.

Similarly, the SISO mode and the MIMO mode are available. The specific process is similar to that described in the fourth embodiment of the present invention, and is not further described.

Figure 12:
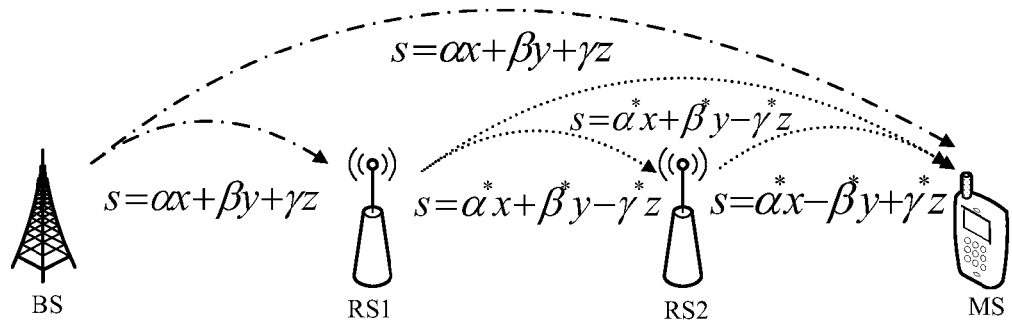
FIG. 12 is a schematic diagram illustrating the data forwarding when two RSs are available in the eighth embodiment of the present invention.

The eighth embodiment describes only a scenario where the RS forwards received signals by using two-layer modulation. Multilayer modulation and multiple RSs may also be available. Suppose the information to be sent in the relay system is $b_0b_1b_2b_3b_4b_5$. $b_0b_1$ indicates the data with the highest importance, mapped as the symbol x; $b_2b_3$ indicates the data with higher importance, mapped as the symbol y; $b_4b_5$ indicates the data with the lowest importance, mapped as the symbol z. x, y, and z are multiplied by the corresponding coefficients (assumed to be $\alpha$, $\beta$, and $\gamma$, which may be real numbers or virtual numbers) and then superposed into a high order constellation point s. Then $s=\alpha x+\beta y+\gamma z$. After the signals received by RS1 and RS2 from the BS are processed, the received signals are forwarded in terms of $S=\alpha^*x+\beta^*y-\gamma^*z$ and $s=\alpha^*x-\beta^*y+\gamma^*z$ hierarchical modulation symbols. Certainly, other similar combinations may also be available. Subsequent operations are similar to the data processing method in this embodiment of the present invention. As shown in FIG. 12, the specific process is as follows. The information sent by the BS is $s=\alpha x+\beta y+\gamma z$; the information sent by RS1 is $s=\alpha^*x+\beta^*y-\gamma^*z$; the information sent by RS2 is $s=\alpha^*x-\beta^*y+\gamma^*z$; the receiving end may obtain data packets in combination with the data sent by the BS, RS1, and RS2.

Figure 13:
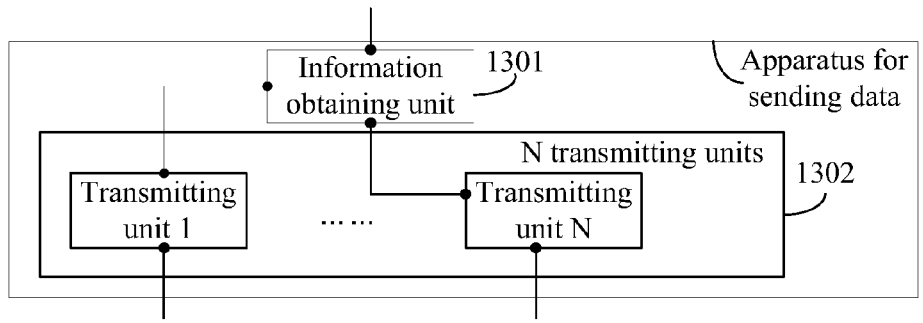
FIG. 13 shows a structure of an apparatus for sending data in a ninth embodiment of the present invention.

The three groups of optimized combinations described in the fourth, fifth, sixth, seventh, and eighth embodiments of the present invention are based on 16QAM and 64QAM modes, that is, two and three modulation orders. Other modulation modes such as 8PSK, 8APSK, and 128QAM are also available in embodiments of the present invention. FIG. 13 shows a structure of an apparatus for sending data in the ninth embodiment of the present invention. The apparatus includes an information obtaining unit 1301, adapted to obtain data packets to be sent; and N transmitting units 1302 are adapted to modulate the data packets by using modulation modes corresponding to the transmitting units, and send the modulated data packets, wherein: the modulation modes form a preset optimized combination of modulation modes; a different modulation mode corresponds to a different group of modulation factors and/or a different group of constellation modulation symbols; the different groups of modulation factors comply with a preset modulation factor mapping relationship; the different groups of constellation modulation symbols comply with a preset constellation modulation symbol mapping relationship. The preceding N transmitting units are transmitting unit 1, . . . , transmitting unit N.

Each transmitting unit may include: a modulation factor obtaining unit, adapted to obtain a group of modulation factors corresponding to the data packets; a mapping unit, adapted to map the data packets to the constellation points according to the preset constellation modulation mode, and obtain constellation modulation symbols corresponding to the data packets; a combining unit, adapted to combine the group of modulation factors with the constellation modulation symbols to obtain a modulation combination; and a sending unit, adapted to send the modulation combination.

In the preceding embodiments of the present invention, each group of modulation factors corresponding to each modulation mode complies with the preset modulation factor mapping relationship and/or each group of constellation modulation symbols complies with the preset constellation modulation symbol mapping relationship, so that the data corresponding to the data packets may have different symbols. Thus, the symbol errors, the frame error rate, and the bit error rate are reduced, and the system performance is improved.

To enable the receiving ends to detect the received information properly, the apparatus for sending data in this embodiment may further include an ID sending unit, adapted to send IDs of the modulation modes used by the transmitting units for modulating the data packets, after the N transmitting units 1302 modulating the data packets by using the modulation modes corresponding to the transmitting units and sending the modulated data packets.

Figure 14:
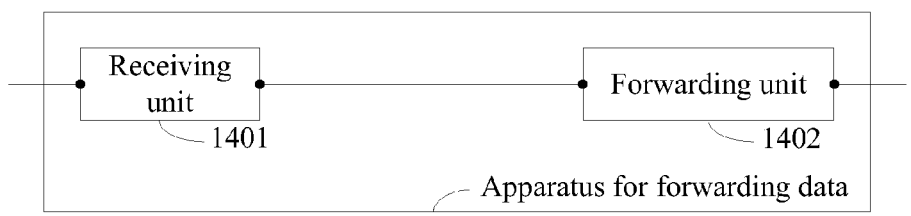
FIG. 14 shows a structure of an apparatus for forwarding data in a tenth embodiment of the present invention.

FIG. 14 shows a structure of an apparatus for forwarding data in the tenth embodiment of the present invention. The apparatus includes a receiving unit 1401, adapted to receive data packets modulated by using a first modulation mode; and a forwarding unit 1402, adapted to modulate the data packets by using a second modulation mode corresponding to the first modulation mode, and send the modulated data packets, where: the first modulation mode and the second modulation mode form a preset optimized combination; a first group of modulation factors used by the first modulation mode to modulate the data packets is different from a second group of modulation factors used by the second modulation mode to modulate the data packets and/or a first group of constellation modulation symbols used by the first modulation mode is different from a second group of constellation modulation symbols used by the second modulation mode, where the first group of modulation factors and the second group of modulation factors comply with the preset modulation factor mapping relationship; the first group of constellation modulation symbols and the second group of constellation modulation symbols comply with the preset constellation modulation symbol mapping relationship.

The forwarding unit 1402 includes a modulation factor obtaining unit, adapted to obtain the second group of modulation factors corresponding to the data packets, where the second group of modulation factors and the first group of modulation factors comply with the preset modulation factor mapping relationship; a mapping unit, adapted to map the data packets to the constellation point according to the preset constellation modulation mode, and obtain constellation modulation symbols corresponding to the data packets; a combining unit, adapted to combine the second group of modulation factors and the constellation modulation symbols into a modulation combination; and a sending unit, adapted to send the modulation combination.

In this embodiment, the second group of modulation factors used by the second modulation mode during the forwarding and the first group of modulation factors used by the first modulation mode comply with the preset modulation factor mapping relationship and/or the second group of constellation modulation symbols used by the second modulation mode and the first group of constellation modulation symbols used by the first modulation mode comply with the preset constellation modulation symbol mapping relationship. In this way, the information modulated by the second modulation mode and the information modulated by the first modulation mode may have different symbols, so that the errors such as noises (for example, the error in the second transmission and the error in the first transmission) may not be deflected in the same direction. This reduces the symbol errors of the data packets obtained by the receiving ends, reduces the frame error rate and bit error rate, and increases the communication accuracy.

Figure 15:
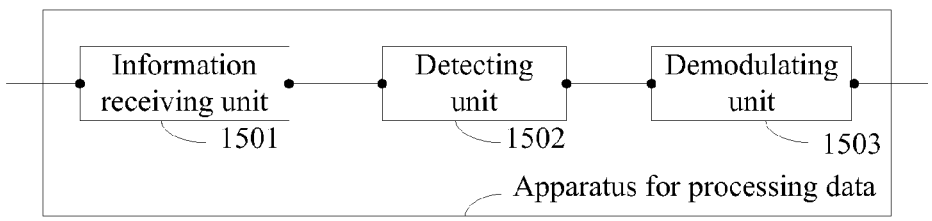
FIG. 15 shows a structure of an apparatus for processing data in an eleventh embodiment of the present invention.

FIG. 15 shows a structure of an apparatus for processing data in the eleventh embodiment of the present invention. The apparatus includes an information receiving unit 1501, adapted to receive at least two modulated modulation combinations obtained by using modulation modes, where: the modulation modes form a preset optimized combination of modulation modes; a different modulation mode corresponds to a different group of modulation factors and/or a different group of constellation modulation symbols; the different groups of modulation factors comply with a preset modulation factor mapping relationship; the different groups of constellation modulation symbols comply with a preset constellation modulation symbol mapping relationship. A detecting unit 1502 is adapted to perform signal detection on at least two modulated modulation combinations by using the preset signal reception technology to obtain modulated data packets. A demodulating unit 1503, adapted to demodulate the modulated data packets to obtain data.

Multiple modulation modes may be available. To know the specific modulation mode, the apparatus for processing the data in this embodiment may further include an ID receiving unit, adapted to receive IDs of modulation modes of at least two modulation combinations; in this case. The detecting unit 1502 is adapted to perform signal detection on at least two modulated modulation combinations by using the preset signal reception technology according to the IDs of the modulation modes.

According to the preceding description, the received at least two modulation combinations are modulated by using different modulation modes, and different modulation factors used by each modulation mode comply with the preset modulation factor mapping relationship and/or different constellation modulation symbols used by each modulation mode comply with the preset constellation modulation symbol mapping relationship. Thus, the received modulation combinations (at least two) may have different symbols. With the difference in symbols, the errors such as noises (for example, the error in the second transmission and the error in the first transmission) may not be deflected in the same direction. This reduces the symbol errors of the data packets obtained by the receiving ends, reduces the frame error rate and bit error rate, and increases the communication accuracy.

It is understandable to those skilled in the art that all or part of steps of the preceding embodiments may be implemented by related hardware instructed by a program. The program may be stored in a computer readable storage medium. When the program is executed, the process includes obtaining data packets to be sent; and modulating, by each transmit diversity branch, the data packets by using modulation mode corresponding to the each transmit diversity branch, and sending the modulated data packets. The modulation modes form a preset optimized combination of modulation modes. A different modulation mode corresponds to a different group of modulation factors and/or a different group of constellation modulation symbols. The different groups of modulation factors comply with a preset modulation factor mapping relationship. The different groups of constellation modulation symbols comply with a preset constellation modulation symbol mapping relationship.

In another embodiment, the process includes receiving data packets modulated by using a first modulation mode and modulating the data packets by using a second modulation mode corresponding to the first modulation mode, and sending the modulated data packets. The first modulation mode and the second modulation mode form a preset optimized combination. A first group of modulation factors for modulating the data packets by using the first modulation mode is different from a second group of modulation factors for modulating the data packets by using the second modulation mode or a first group of constellation modulation symbols of the first modulation mode is different from a second group of constellation modulation symbols of the second modulation mode. The first group of modulation factors and the second group of modulation factors comply with a preset modulation factor mapping relationship. The first group of constellation modulation symbols and the second group of constellation modulation symbols comply with a preset constellation modulation symbol mapping relationship.

In another embodiment, the process includes receiving at least two modulated modulation combinations obtained by using modulation modes. The modulation modes form a preset optimized combination of modulation modes Different modulation modes correspond to different groups of modulation factors and/or different group of constellation modulation symbols. The different groups of modulation factors comply with a preset modulation factor mapping relationship; the different groups of constellation modulation symbols comply with a preset constellation modulation symbol mapping relationship. Signal detection is performed on the at least two modulated modulation combinations by using a preset signal reception technology. Modulated data packets are obtained and demodulated to obtain data.

The above storage medium may be a read-only memory (ROM), a magnetic disk or a compact disk read-only memory (CD-ROM).

Detailed above are a method and apparatus for sending, forwarding, and processing data in embodiments of the present invention. The preceding embodiments are only intended to help understand the method and idea of the present invention. It is apparent to persons skilled in the art that various modifications and variations can be made to the present invention without departing from the scope or spirit of the invention. To conclude, the present invention should not be limited to the specifications.

What is claimed is:

1. A method for sending data, the method comprising:
obtaining data packets at a first transmit diversity branch and at a second transmit diversity branch;
modulating the data packets at the first transmit diversity branch using a first modulation mode;
sending the modulated data packets from the first transmit diversity branch;
modulating the data packets at the second transmit diversity branch using a second modulation mode; and
sending the modulated data packets from the second transmit diversity branch;
wherein the first modulation mode and the second modulation mode form a preset optimized combination,
wherein a first group of modulation factors for modulating the data packets by using the first modulation mode is different from a second group of modulation factors for modulating the data packets by using the second modulation mode,
wherein the first group of modulation factors and the second group of modulation factors comply with a preset modulation factor mapping relationship and wherein each modulation factor in the first group of modulation factors is mapped to a corresponding modulation factor in the second group of modulation factors, wherein the preset modulation factor mapping relationship requires that mapped modulation factors have an identical absolute value, are conjugates of one another, or have an identical modulus;

wherein a first group of constellation points modulation symbols of the first modulation mode is different from a second group of constellation points modulation symbols of the second modulation mode, and wherein the first group of constellation points modulation symbols and the second group of constellation points modulation symbols comply with a preset constellation points modulation symbol mapping relationship; and wherein the preset constellation points modulation symbol mapping relationship requires the first group of constellation points modulation symbols and the second group of constellation points modulation symbols have at least one different constellation points modulation symbols, wherein the different constellation points modulation symbols meet one of the following conditions: identical absolute value, mutual conjugation, or identical modulus.

2. The method of claim 1, wherein the first group of modulation factors includes at least two modulation factors, wherein each modulation factor in the first group of modulation factors corresponds to a different layer of the data packets, wherein the second group of modulation factors includes at least two modulation factors, and wherein each modulation factor in the second group of modulation factors corresponds to a different layer of the data packets.

3. The method of claim 1, wherein the first group of constellation points modulation symbols includes at least two constellation points modulation symbols, each constellation points modulation symbol corresponding to a layer of the data packets, and wherein the second group of constellation points modulation symbols includes at least two constellation points modulation symbols, each constellation points modulation symbol corresponding to a layer of the data packets.

4. The method of claim 1, wherein the method further comprises:

sending an ID of the first modulation mode from the first transmit diversity branch after modulating the data packets at the first transmit diversity branch; and sending an ID of the second modulation mode from the second transmit diversity branch after modulating the data packets at the second transmit diversity branch.

5. The method of claim 1, wherein the modulating by the first transmit diversity branch comprises:

obtaining the first group of modulation factors corresponding to the data packets;

mapping the data packets to constellation points according to a preset constellation modulation mode;

obtaining constellation modulation symbols corresponding to the data packets; and combining the first group of modulation factors with the constellation modulation symbols to obtain a first modulation combination; and sending the first modulation combination.

6. The method of claim 5, wherein the modulating the data packets at the second transmit diversity branch comprises:

obtaining the second group of modulation factors corresponding to the data packets;

mapping the data packets to constellation points according to a preset constellation modulation mode, and obtaining constellation modulation symbols corresponding to the data packets;

combining the second group of modulation factors with the constellation modulation symbols to obtain a second modulation combination; and sending the second modulation combination.

7. The method of claim 1, wherein the first transmit diversity branch comprises a Base Station (BS) and the second transmit diversity branch comprises a Relay Station (RS).

8. The method of claim 7, wherein obtaining data packets comprises:

obtaining, by the BS, the data packets to be sent; and modulating, by the BS, the data packets by using the first modulation mode, and sending the modulated data packets to the RS.

9. The method of claim 1, wherein the preset modulation factor mapping relationship requires that mapped modulation factors have an identical absolute value when the mapped modulation factors are real numbers, and wherein the preset modulation factor mapping relationship requires that mapped modulation factors are conjugates of one another or have an identical modulus when the mapped modulation factors are complex numbers.

10. The method of claim 1, wherein the preset modulation factor mapping relationship requires that mapped modulation factors are complex conjugates of one another when the mapped modulation factors are complex numbers.

11. The method of claim 1, wherein the preset modulation factor mapping relationship requires that mapped modulation factors have an identical modulus when the mapped modulation factors are complex numbers.

12. The method of claim 1, wherein the first group of modulation factors includes at least a first modulation factor that is excluded from the second group of modulation factors, and wherein the second group of modulation factors includes at least a second modulation factor that is excluded from the first group of modulation factors.

13. A method for processing data, the method comprising:

receiving two modulated modulation combinations obtained by using a first and second modulation modes, wherein the first and second modulation modes form a preset optimized combination of modulation modes; wherein the first and second modulation modes correspond to a first and second groups of modulation factors respectively, wherein the first and second groups of modulation factors comply with a preset modulation factor mapping relationship, wherein each modulation factor in the first group of modulation factors is mapped to a corresponding modulation factor in the second group of modulation factors, and wherein the preset modulation factor mapping relationship requires that mapped modulation factors have an identical absolute value, are mutual conjugates of one or another, or have an identical modulus;

performing signal detection on the two modulated modulation combinations by using a preset signal reception technology to obtain modulated data packets; and demodulating the modulated data packets to obtain data;

wherein a first group of constellation points modulation symbols of the first modulation mode is different from a second group of constellation points modulation symbols of the second modulation mode, and wherein the first group of constellation points modulation symbols and the second group of constellation points modulation symbols comply with a preset constellation points modulation symbol mapping relationship; and wherein the preset constellation points modulation symbol mapping relationship requires the first group of constellation points modulation symbols and the second group of constellation points modulation symbols have at least one different constellation points modulation symbols, wherein the different constellation points modulation symbols meet one of the following conditions: identical absolute value, mutual conjugation, or identical modulus.

14. The method of claim 13, wherein, before performing signal detection, the method further comprises receiving modulation mode IDs of the two modulated modulation combinations.

15. The method of claim 14, wherein performing signal detection comprises performing signal detection on the two modulated modulation combinations using the preset signal reception technology according to the modulation mode IDs.

16. The method of claim 13, wherein the preset signal reception technology is a zero-forcing reception technology, a linear minimum mean-squared error reception technology, a maximum likelihood reception technology, a successive interference cancellation reception technology, or a parallel interference cancellation reception technology.

17. An apparatus for sending data, comprising:
   an information obtaining unit configured to obtain data packets to be sent; and
   a plurality of transmitting units configured to modulate the data packets using a first and second modulation modes corresponding to the transmitting units, and to send the modulated data packets;
   wherein the first and second modulation modes form a preset optimized combination of modulation modes;
   wherein the first and second modulation modes correspond to a first and second groups of modulation factors respectively,
   wherein the first and second groups of modulation factors comply with a preset modulation factor mapping relationship, and each modulation factor in the first group of modulation factors is mapped to a corresponding modulation factor in the second group of modulation factors, and wherein the preset modulation factor mapping relationship requires that mapped modulation factors have an identical absolute value, are mutual conjugates of one or another, or have an identical modulus;

wherein a first group of constellation points modulation symbols of the first modulation mode is different from a second group of constellation points modulation symbols of the second modulation mode, and wherein the first group of constellation points modulation symbols and the second group of constellation points modulation symbols comply with a preset constellation points modulation symbol mapping relationship; and wherein the preset constellation points modulation symbol mapping relationship requires the first group of constellation points modulation symbols and the second group of constellation points modulation symbols have at least one different constellation points modulation symbols, wherein the different constellation points modulation symbols meet one of the following conditions: identical absolute value, mutual conjugation, or identical modulus.

18. The apparatus of claim 17, further comprising an ID sending unit adapted to send IDs of the first and second modulation modes used by the transmitting units for modulating the data packets, after the plurality of transmitting units modulate the data packets.

19. The apparatus of claim 18, wherein the transmitting unit comprises:
   a modulation factor obtaining unit configured to obtain a group of modulation factors corresponding to the data packets;
   a mapping unit configured to map the data packets to constellation points according to a preset constellation modulation mode, and to obtain constellation modulation symbols corresponding to the data packets;
   a combining unit configured to combine the group of modulation factors with the constellation modulation symbols to obtain a modulation combination; and
   a sending unit configured to send the modulation combination.

* * * * *